(12) United States Patent
Chou et al.

(10) Patent No.: US 9,316,014 B2
(45) Date of Patent: Apr. 19, 2016

(54) LEVER VISCOELASTIC DAMPING WALL ASSEMBLY

(71) Applicant: NATIONAL APPLIED RESEARCH LABORATORIES, Taipei (TW)

(72) Inventors: Chung-Che Chou, Taipei (TW); Steven Tsuang, Meridian, ID (US); Yung-Hsiang Chen, Taipei (TW); Luh-Maan Chang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 14/334,635

(22) Filed: Jul. 17, 2014

(65) Prior Publication Data

US 2015/0204097 A1 Jul. 23, 2015

(30) Foreign Application Priority Data

Jan. 17, 2014 (TW) .............................. 103101846 A
May 1, 2014 (TW) .............................. 103115710 A

(51) Int. Cl.
  *E04H 9/02* (2006.01)
  *E04H 9/14* (2006.01)
(52) U.S. Cl.
  CPC .................. *E04H 9/14* (2013.01); *E04H 9/024* (2013.01); *E04H 9/027* (2013.01); *E04H 9/022* (2013.01)
(58) Field of Classification Search
  CPC ........... E04H 9/14; E04H 9/027; E04H 9/024; E04H 9/022
  USPC ............ 52/167.1, 167.3, 167.4, 167.5, 167.6, 52/167.7, 167.8; 188/378; 248/562, 564, 248/570
  See application file for complete search history.

(56) References Cited

U.S. PATENT DOCUMENTS

| 4,615,157 A | * | 10/1986 | Murray ........................ 52/167.4 |
| 4,991,366 A | * | 2/1991 | Teramura et al. ............ 52/167.8 |
| 5,732,802 A | * | 3/1998 | Tsukagoshi ................... 188/378 |
| 5,946,866 A | * | 9/1999 | Weglewski et al. .......... 52/167.1 |

(Continued)

FOREIGN PATENT DOCUMENTS

| CN | 1245858 A | 3/2000 |
| JP | H04-001216 | 1/1992 |

(Continued)

OTHER PUBLICATIONS

First Examination Report issued to New Zealand Counterpart Application No. 628246 by the Intellectual Property Office of New Zealand on Aug. 12, 2014 (2 pages).

(Continued)

*Primary Examiner* — Brent W Herring
(74) *Attorney, Agent, or Firm* — DLA Piper LLP (US)

(57) ABSTRACT

A lever viscoelastic damping wall assembly includes a first wall, a second wall and a viscoelastic damper. The first and second walls are connected respectively to a first structural member and a second structural member. The viscoelastic damper includes a swing rod connected pivotally to the first and second walls, a first viscoelastic unit connected between the first wall and an end portion of the swing rod, and a second viscoelastic unit connected between the second wall and an opposite end portion of the swing rod. The swing rod is driven to pivot relative to the first and second walls, and to thereby generate shear deformations of the first and second viscoelastic units to damp a relative movement between the first and second structural members.

2 Claims, 27 Drawing Sheets

(56) References Cited

U.S. PATENT DOCUMENTS

| | | | |
|---|---|---|---|
| 6,223,483 B1 | 5/2001 | Tsukagoshi | |
| 6,230,450 B1* | 5/2001 | Kuroda et al. | 52/167.8 |
| 8,621,791 B2* | 1/2014 | Mualla | 52/167.3 |
| 8,807,307 B2* | 8/2014 | Choi | 188/381 |
| 2004/0128921 A1* | 7/2004 | Mualla | 52/167.1 |

FOREIGN PATENT DOCUMENTS

| | | |
|---|---|---|
| JP | 10-246026 | 9/1998 |
| JP | 2000-297556 | 10/2000 |
| JP | 2000-314448 | 11/2000 |
| JP | 2005-188277 | 7/2005 |
| JP | 2005-220714 | 8/2005 |
| JP | 2011-17153 | 1/2011 |

OTHER PUBLICATIONS

Search Report of TW Patent Application No. 103115710 dated Oct. 27, 2015 (2 pages).

* cited by examiner

LEVER VISCOELASTIC DAMPING WALL ASSEMBLY

CROSS-REFERENCE TO RELATED APPLICATION

This application claims priority of Taiwanese Application No. 103101846, filed on Jan. 17, 2014, and Taiwanese Application No. 103115710, filed on May 1, 2014.

BACKGROUND OF THE INVENTION

1. Field of the Invention

The invention relates to a lever viscoelastic damping wall assembly, more particularly to a lever viscoelastic damping wall assembly for use in an architectural structure.

2. Description of the Related Art

Chinese Patent Publication No. CN 1245858A discloses a conventional damper apparatus for damping a relative movement between two structural elements resulting from an earthquake or a gust of wind.

The conventional damper apparatus includes a lever and a viscoelastic member. The lever has opposite first and second end portions, and an intermediate portion disposed between the first and second end portions. A distance between the first end portion and the intermediate portion is smaller than that between the intermediate portion and the second end portion. The first end portion of the lever is connected pivotally to one of the structural elements. The intermediate portion is connected pivotally to the other one of the structural elements. The viscoelastic member is connected between the second end portion of the lever and the other one of the structural elements. Through the abovementioned configuration, the lever of the conventional damper is capable of generating a relative displacement between the second end portion and the other one of the structural elements in response to the relative movement between the structural elements, which is greater than that between the structural elements, and which generates deformation of the viscoelastic member to damp the relative movement between the structural elements.

However, in response to an intense relative movement between the structural elements, the amplified relative movement between the second end portion and the other one of the structural elements may cause fracture and failure of the viscoelastic member.

SUMMARY OF THE INVENTION

Therefore, the object of the present invention is to provide a lever viscoelastic damping wall assembly that can overcome the aforesaid drawbacks associated with the prior arts.

Accordingly, a lever viscoelastic damping wall assembly of the present invention is adapted for damping a relative movement between a first structural member and a second structural member in a first direction. The first and second structural members are spaced apart from each other. The lever viscoelastic damping wall assembly includes a first wall, a second wall and a viscoelastic damper. The first wall is connected to the first structural member, and is formed with at least one pivot hole. The second wall is connected to the second structural member, and is forced with at least one pivot hole. The pivot holes of the first and second walls are spaced apart from each other in a second direction perpendicular to the first direction. The viscoelastic damper includes at least one swing rod, at least one first viscoelastic unit, at least one second viscoelastic unit, at least one first bolt assembly and at least one second bolt assembly. The swing rod has a middle portion formed with first and second extending holes, and first and second end portions disposed respectively at opposite sides of the middle portion. The first and second extending holes are aligned respectively with the pivot holes of the first and second walls. The first viscoelastic unit is connected between the first wall and the first end portion of the swing rod. The second viscoelastic unit is connected between the second wall and the second end portion of the swing rod. The first bolt assembly extends through the pivot hole of the first wall and the first extending hole of the swing rod to interconnect pivotally the swing rod and the first wall. The second bolt assembly extends through the pivot hole of the second wall and the second extending hole of the swing rod to interconnect pivotally the swing rod and the second wall. The first and second structural members drive a relative movement between the first and second walls in the first direction due to the relative movement therebetween, so as to pivot the swing rod relative to the first and second walls, and to thereby generate shear deformations of the first and second viscoelastic units to damp the relative movement therebetween.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
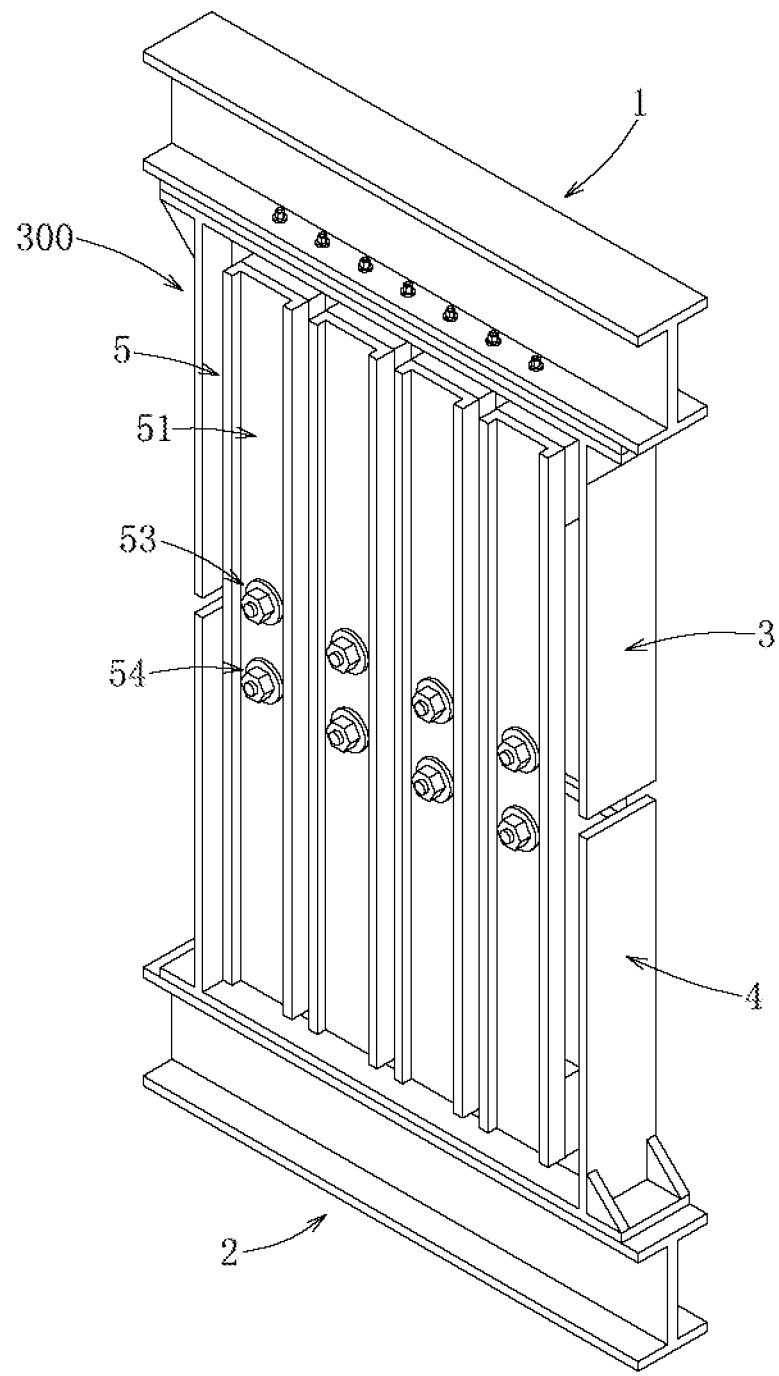
FIG. 1 is a perspective view of a first preferred embodiment of a lever viscoelastic damping wall assembly according to the invention.

Before the present invention is described in greater detail, it should be noted that like elements are denoted by the same reference numerals throughout the disclosure.

Figure 2:
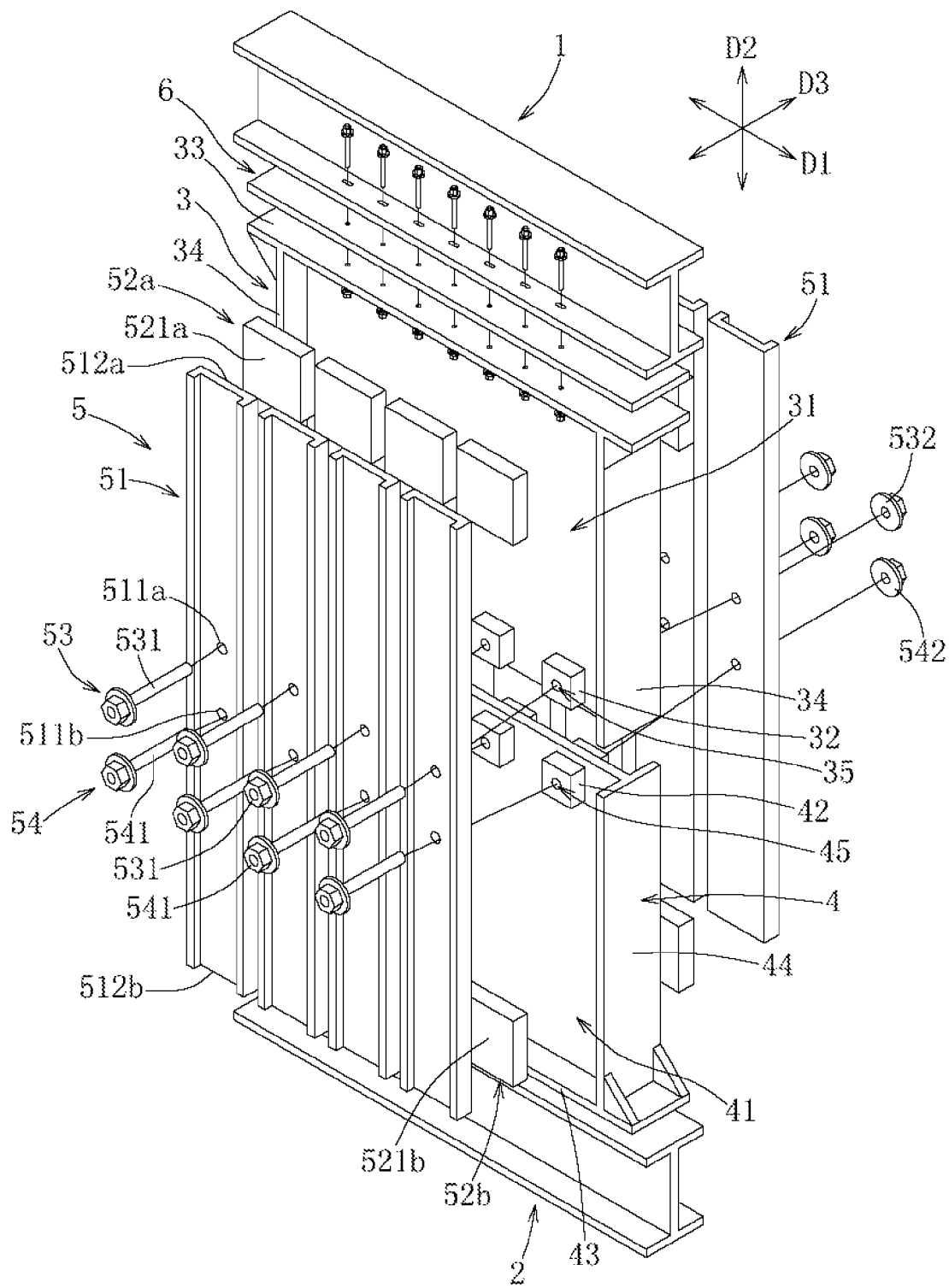
FIG. 2 is an exploded perspective view of the first preferred embodiment.

As shown in FIGS. 1 and 2, a first preferred embodiment of a lever viscoelastic damping wall assembly 300 according to the present invention is adapted for damping a relative movement between a first structural member 1 and a second structural member 2 in a first direction (D1) that results from an earthquake or a gust of wind. In this embodiment, the first and second structural members 1, 2 are spaced apart from each other in a second direction (D2) perpendicular to the first direction (D1) (i.e., a vertical direction), and are configured as beams. However, the first and second structural members 1, 2 may be configured as columns or other structures.

The first embodiment of the lever viscoelastic damping wall assembly 300 includes a first wall 3, a second wall 4, a viscoelastic damper 5 and a friction damper 6.

Figure 3:
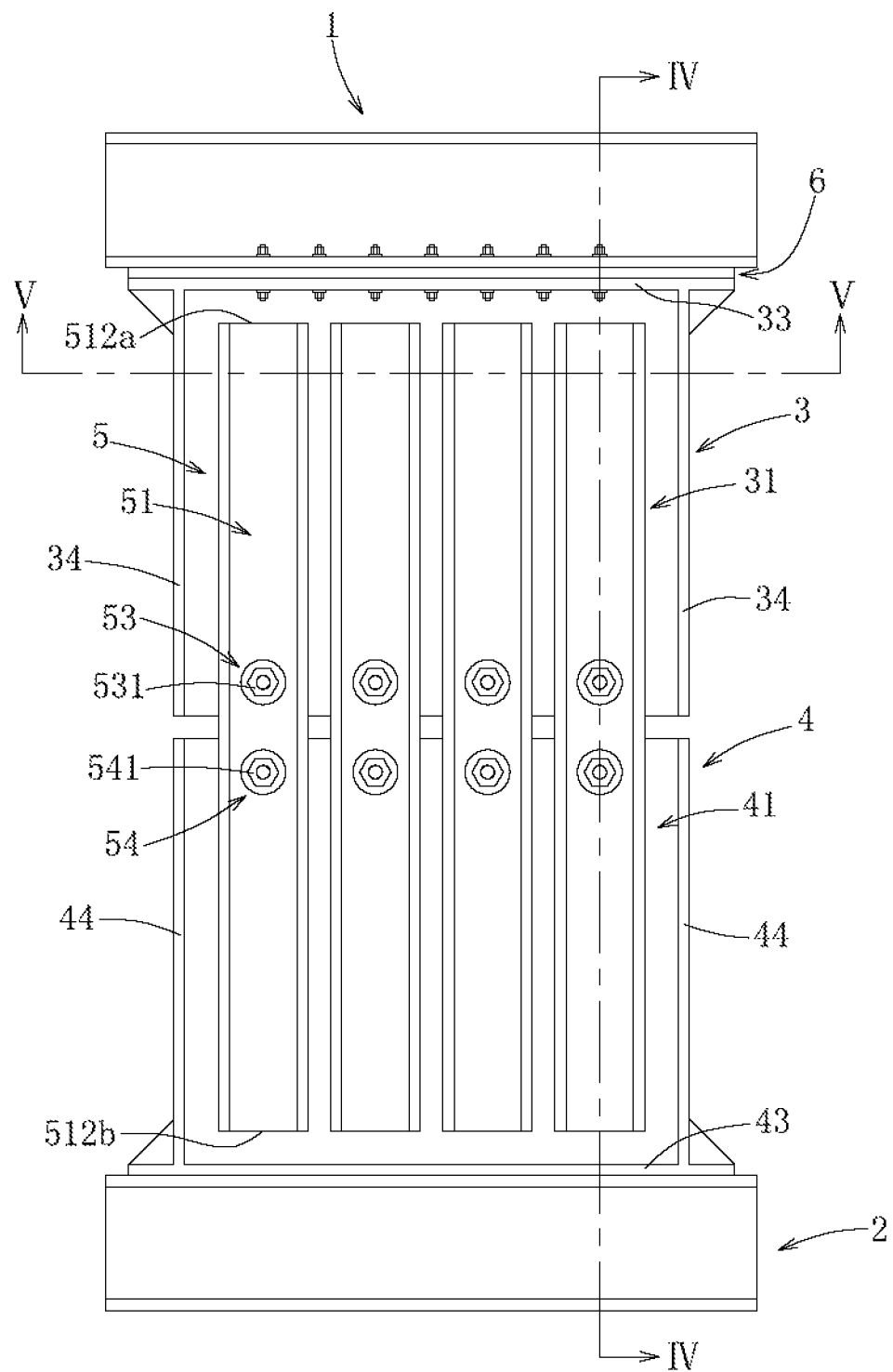
FIG. 3 is a side view of the first preferred embodiment.
Figure 4:
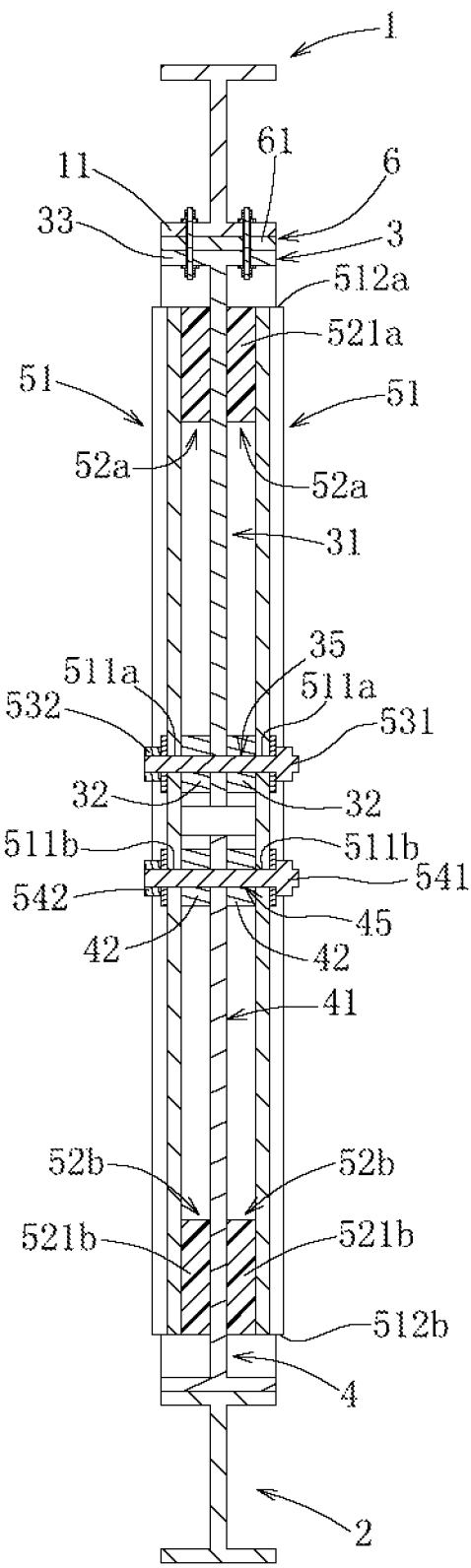
FIG. 4 is a sectional view of the first preferred embodiment taken along line IV-IV in FIG. 3.
Figure 5:
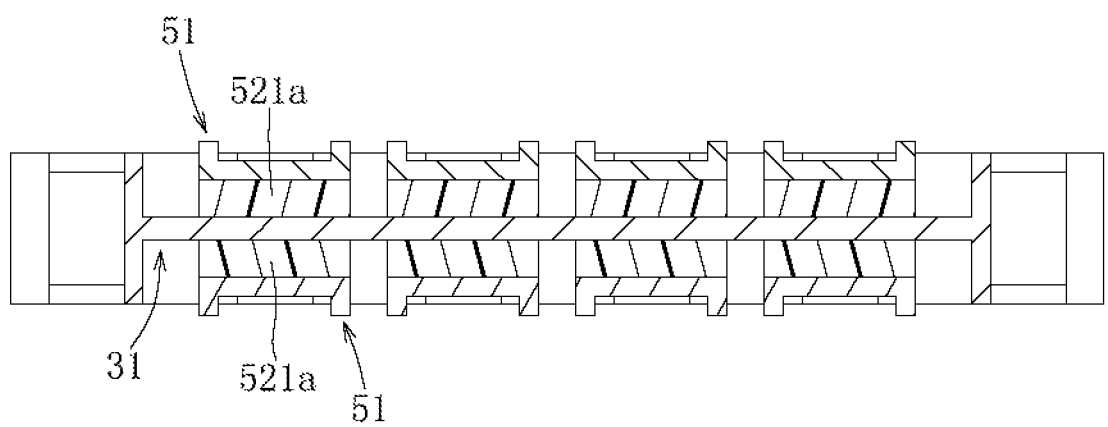
FIG. 5 is another sectional view of the first preferred embodiment taken along line V-V in FIG. 3.

Referring further to FIGS. 3, 4 and 5, the first wall 3 is connected to a lower end of the first structural member 1, and has a main wall segment 31, a plurality of pairs of block segments 32, an end wall segment 33 and a pair of reinforcing wall segments 34. Each pair of the block segments 32 are soldered respectively to opposite sides of a lower portion of the main wall segment 31 of the first wall 3 in a third direction (D3) perpendicular to the first and second directions (D1, D2), are aligned with each other in the third direction (D3), and are spaced apart from the other pairs of the block segments 32 in the first direction (D1). The first wall 3 further has a plurality of pivot holes 35 each being formed through an assembly of a respective pair of the block segments 32 and the main wall segment 31 (see FIG. 4). The end wall segment 33 is connected to an upper end of the main wall segment 31, and is proximate to the first structural member 1. The reinforcing wall segments 34 are connected respectively to opposite sides of the main wall segment 31 in the first direction (D1).

The second wall 4 has a configuration similar to that of the first wall 3, and is spaced apart from the first wall 3 in the second direction (D2). The second wall 4 is connected to an upper end of the second structural member 2, and has a main wall segment 41, a plurality of pairs of block segments 42, an end wall segment 43 and a pair of reinforcing wall segments 44. Each pair of the block segments 42 are soldered respectively to opposite sides of an upper portion of the main wall segment 41 of the second wall 4 in the third direction (D3), are aligned with each other in the third direction (D3), and are spaced apart from the other pairs of the block segments 42 in the first direction (D1). The second wall 4 further has a plurality of pivot holes 45 that correspond respectively to the pivot holes 35 of the first wall 3. Each of the pivot holes 45 of the second wall 4 is formed through an assembly of a respective pair of the block segments 42 and the main wall segment 41, and is spaced apart from the corresponding one of the pivot holes 35 of the first wall 3 in the second direction (D2) (see FIG. 4). The end wall segment 43 is connected to a lower end of the main wall segment 41, and is proximate to the second structural member 2. The reinforcing wall segments 44 are connected respectively to opposite sides of the main wall segment 41 in the first direction (D1).

The viscoelastic damper 5 includes a plurality of pairs of swing rods 51, two first viscoelastic units 52a, two second viscoelastic units 51b, a plurality of first bolt assemblies 53 and a plurality of second bolt assemblies 54.

Each of the swing rods 51 extends in the second direction (D2), and has a middle portion formed with first and second extending holes 511a, 511b, and first and second end portions 512a, 512b disposed respectively at opposite sides of the middle portion in the second direction (D2). The first and second extending holes 511a, 511b of the middle portion of each of the swing rods 51 are spaced apart from each other in the second direction (D2), and are proximate to the first and second end portions 512a, 512b, respectively. A distance between the first and second extending holes 511a, 511b is smaller than that between the first extending hole 511a and the first end portion 512a, and is smaller than that between the second extending hole 511b and the second end portion 512b.

Each pair of the swing rods 51 are spaced apart from each other in the third direction (D3). The first and second walls 3, 4 are disposed between each pair of the swing rods 51. The first extending holes 511a of each pair of the swing rods 51 are aligned with a respective one of the pivot holes 35 of the first wall 3. The second extending holes 511b of each pair of the swing rods 51 are aligned with a respective one of the pivot holes 45 of the second wall 4.

Each of the first bolt assemblies 53 includes a bolt 531, and a nut 532 connected threadedly to an end portion of the bolt 531. The bolt 531 of each of the first bolt assemblies 53 extends through the first extending holes 511a of a respective pair of the swing rods 51 and the respective one of the pivot holes 35 of the first wall 3, such that the respective pair of the swing rods 51 are connected pivotally to the first wall 3.

Each of the second bolt assemblies 54 includes a bolt 541, and a nut 542 connected threadedly to an end portion of the bolt 541. The bolt 541 of each of the second bolt assemblies 54 extends through the second extending holes 511b of a respective pair of the swing rods 51 and the respective one of the pivot holes 45 of the second wall 4, such that the respective pair of the swing rods 51 are connected pivotally to the second wall 4.

The first viscoelastic units 52a are connected fixedly and respectively to the opposite sides of the first wall 3 in the third direction (D3). In this embodiment, each of the first viscoelastic units 52a includes a plurality of viscoelastic members 521a that are made of rubber or silicone. The first end portions 512a of each pair of the swing rods 51 are connected fixedly and respectively to a respective one of the viscoelastic members 521a of one of the first viscoelastic units 52a and a respective one of the viscoelastic members 521a of the other one of the first viscoelastic units 52a.

The second viscoelastic units 52b are connected fixedly and respectively to the opposite sides of the second wall 4 in the third direction (D3). In this embodiment, each of the second viscoelastic units 52b includes a plurality of viscoelastic members 521b that are made of rubber or silicone. The second end portions 512b of each pair of the swing rods 51 are connected fixedly and respectively to a respective one of the viscoelastic members 521b of one of the second viscoelastic units 52b and a respective one of the viscoelastic members 521b of the other one of the second viscoelastic units 52b. However, each of the first and second viscoelastic units 52a, 52b may include only one viscoelastic member 521a, 521b.

It is noted that, in this embodiment, each of the block segments 32, 42 of the first and second walls 3, 4 has a thickness the same as that of each of the viscoelastic members 521a, 521b of the first and second viscoelastic units 52a, 52b.

When the relative movement between the first and second structural member 1, 2 resulting from an external force in the first direction (D1) occurs, the first and second structural members 1, 2 drive a relative movement between the first and second walls 3, 4 in the first direction (D1), so as to pivot the swing rods 51 relative to the first and second walls 3, 4, and to thereby generate shear deformation of the viscoelastic 521a, 521b of the first and second viscoelastic units 52a, 52b, so as to damp the relative movement therebetween.

Figure 6:
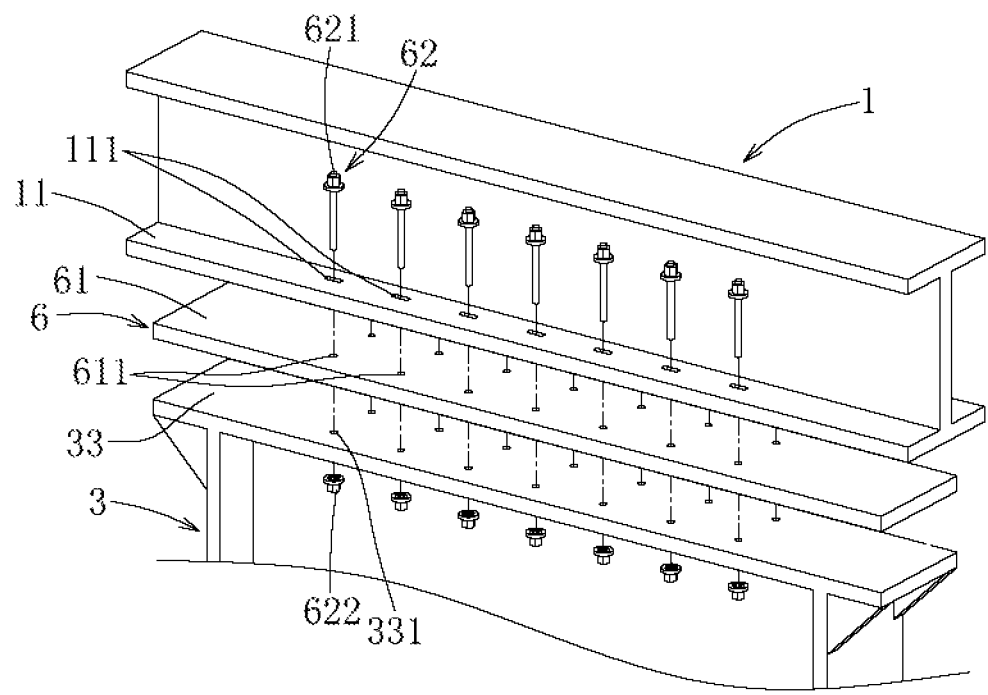
FIG. 6 is a fragmentary exploded perspective view of the first preferred embodiment illustrating a friction damper.
Figure 7:
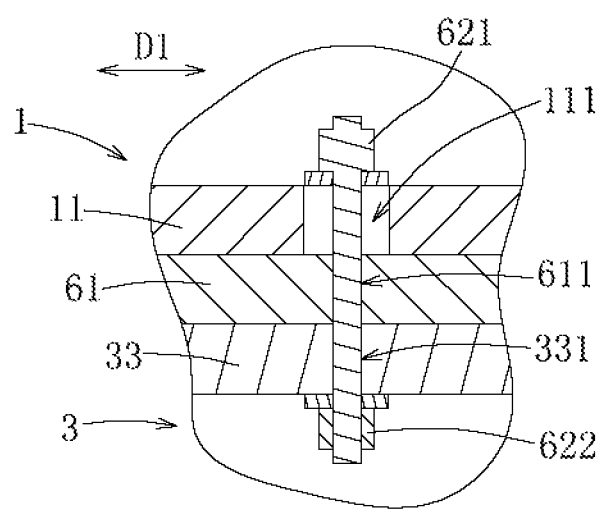
FIG. 7 is a fragmentary sectional view of the first preferred embodiment illustrating the friction damper.

Referring to FIGS. 4, 6 and 7, in this embodiment, the friction damper 6 is disposed between the first structural member 1 and the first wall 3. The first structural member 1 has a lower plate 11 that is formed with a plurality of elongate grooves 111. Each of the elongate grooves 111 extends in the first direction (D1). The end wall segment 33 of the first wall 3 is formed with a plurality of communication holes 331.

The friction damper 6 includes a friction plate 61 and a plurality of bolt assemblies 62.

The friction plate 61 is clamped between the lower plate 11 or the first structural member 1 and the end wall segment 33 of the first wall 3, and is formed with a plurality or through holes 611. In this embodiment, the friction plate 61 is made of copper.

Each of the bolt assemblies 62 includes a bolt 621, and a nut 622 connected threadedly to an end portion of the bolt 621.

The bolt 621 of each of the bolt assemblies 62 extends through a respective one of the communication holes 331 of the end wall segment 33 of the first wall 3, a respective one of the through holes 611 of the friction plate 61 and a respective one of the elongate grooves 111 of the lower plate 11 of the first structural member 1, and is movable along the respective one of the elongate grooves 111.

When the external force driving the relative movement between the first and second structural members 1, 2 does not exceed a maximum static friction between the friction plate 61 and the lower plate 11 of the first structural member 1, the friction, plate 61 and the lower plate 11 of the first structural member 1 do not move relative to each other.

When the external force driving the relative movement between the first and second structural members 1, 2 exceeds a maximum static friction between the friction plate 61 and the lower plate 11 of the first structural member 1, the friction plate 61 and the first wall 3 are movable frictionally relative to the lower plate 11 of the first structural member 1 to damp the relative movement between the first and second structural members 1, 2.

Figure 8:
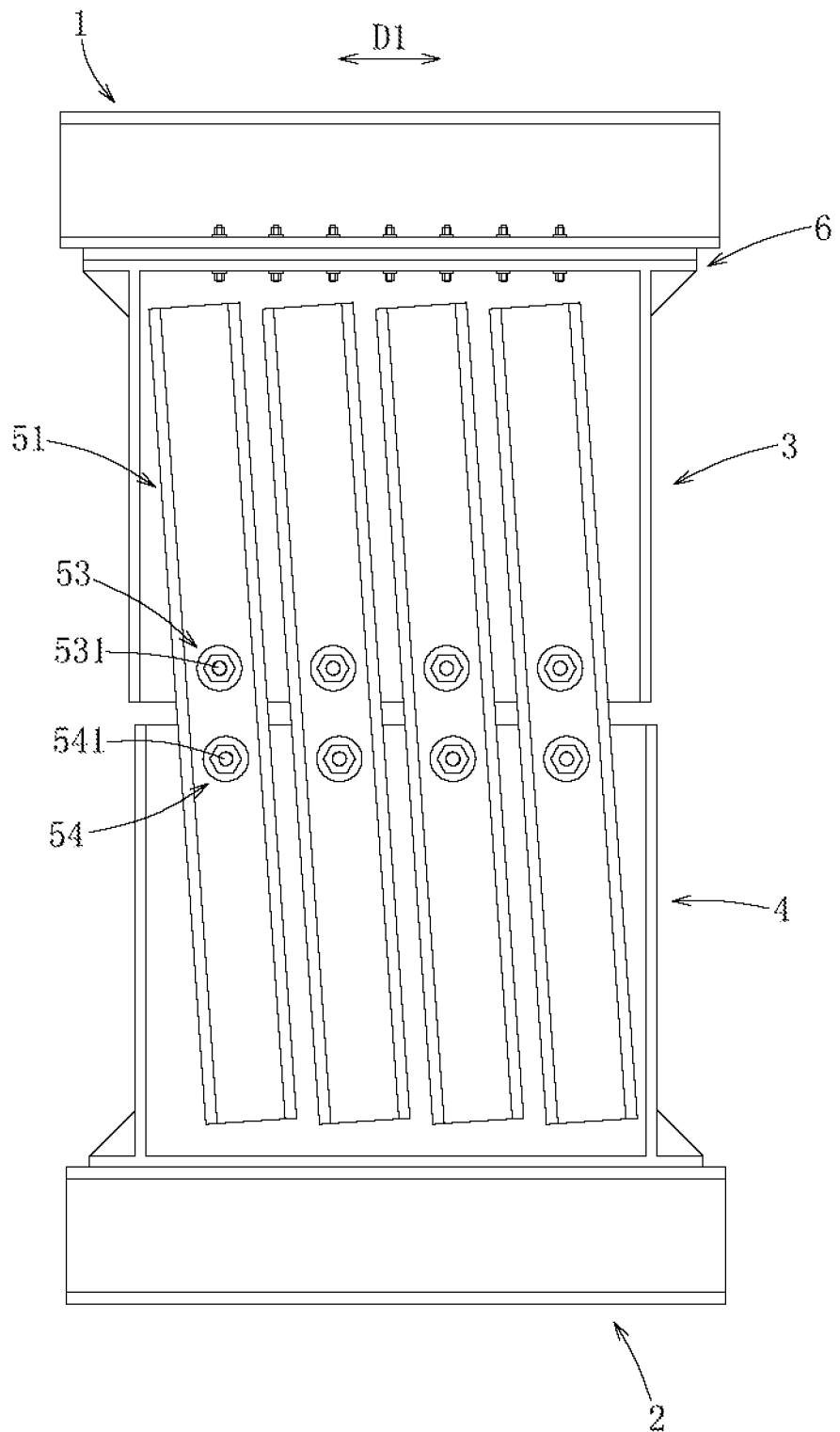
FIG. 8 is a schematic side view of the first preferred embodiment.
Figure 9:
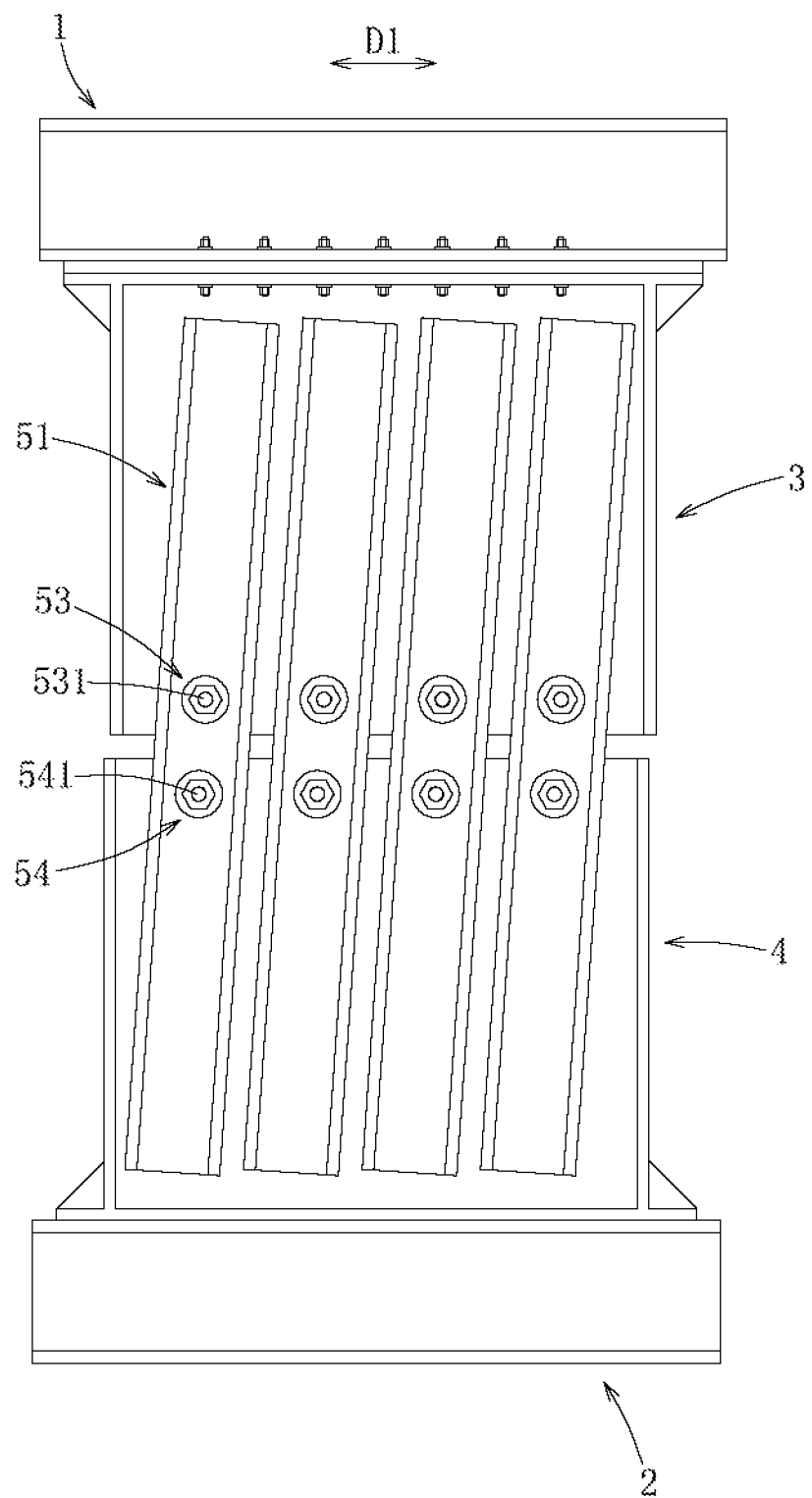
FIG. 9 is another schematic side view of the first preferred embodiment.
Figure 10:
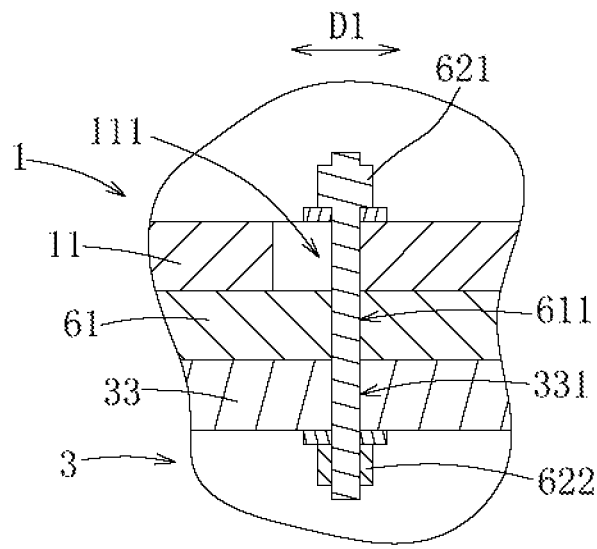
FIG. 10 is a schematic fragmentary sectional view of the friction damper of the first preferred embodiment.
Figure 11:
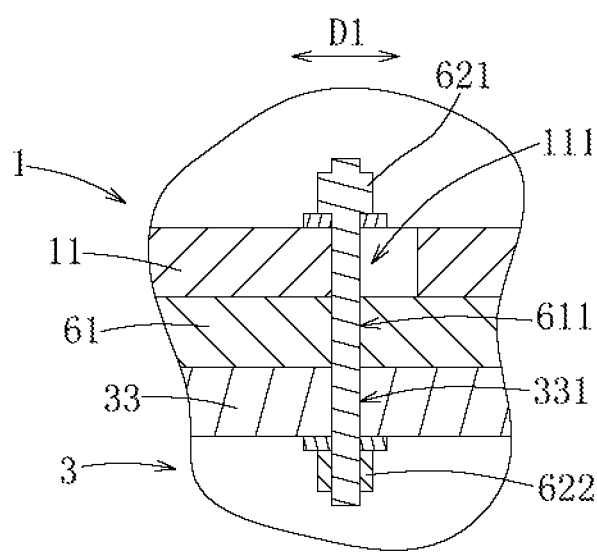
FIG. 11 is another schematic fragmentary sectional view of the friction damper of the first preferred embodiment.

Referring to FIGS. 4, 8 and 9, in this embodiment, the friction damper 6 does not work in response to an earthquake that has a strength less than 5.0 on the Richter scale. So that the friction plate 61 and the lower plate 11 of the first structural member 1 do not move relative to each other, and the swing rods 51 are driven to pivot relative to the first and second walls 3, 4 to generate shear deformations of the viscoelastic members 521a, 521b to damp the relative movement between the first and second structural member 1, 2 in response to an earthquake that measures less than 5.0 on the Richter scale.

Referring to FIGS. 8 to 11, in response to an earthquake that has a strength more than 5.0 on the Richter scale, both of the viscoelastic damper 5 and the friction damper 6 work to damp the relative movement between the first and second structural member 1, 2.

It is noted that the viscoelastic damper 5 of a variation of the first preferred embodiment may includes only one swing rod 51, one first viscoelastic unit 52a, one second viscoelastic unit 52b, one first bolt assembly 53 and one second bolt assembly 54, which also can damp the relative movement between the first and second structural member 1, 2.

Figure 12:
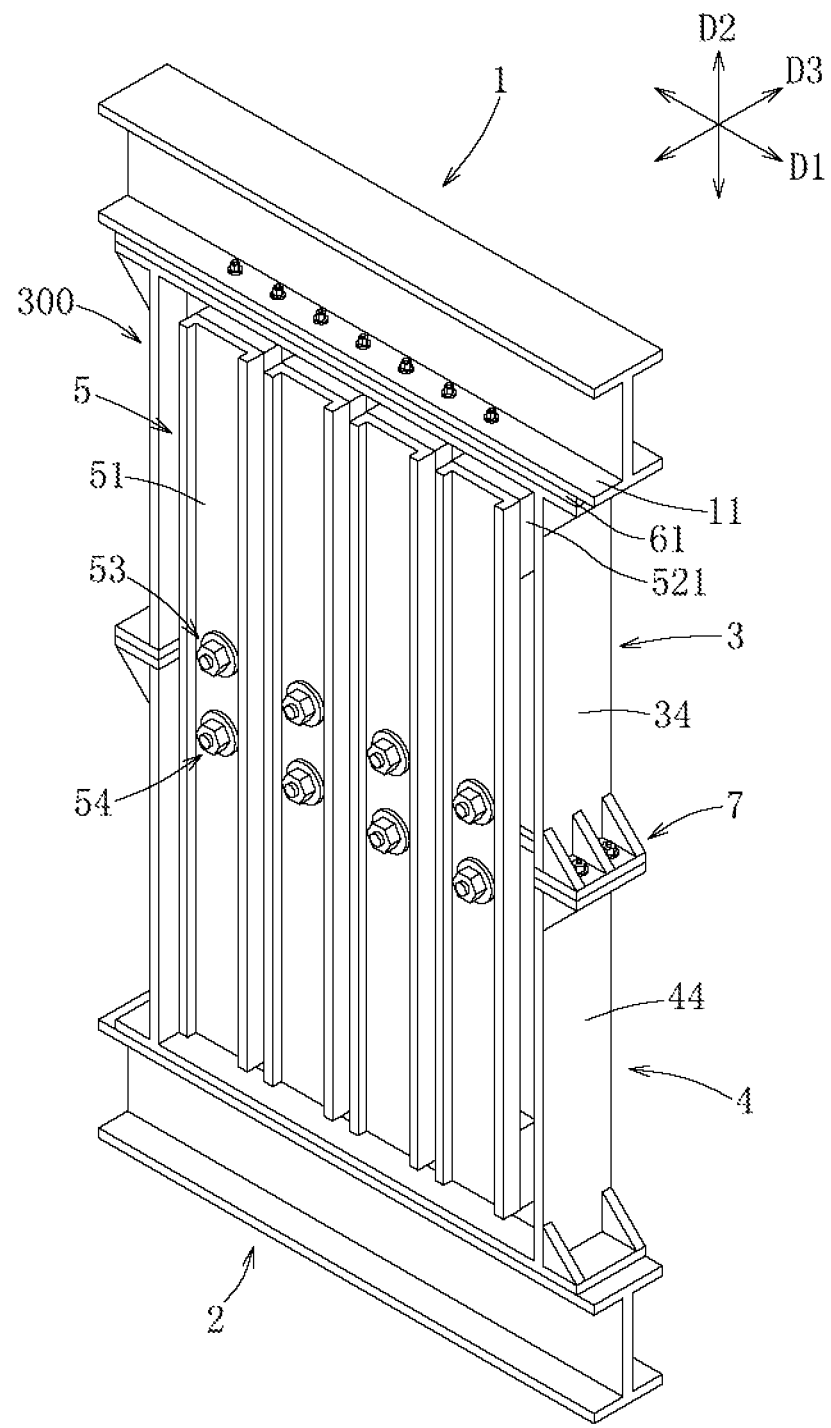
FIG. 12 is a perspective view of a second preferred embodiment of the lever viscoelastic damping wall assembly according to the invention.
Figure 13:
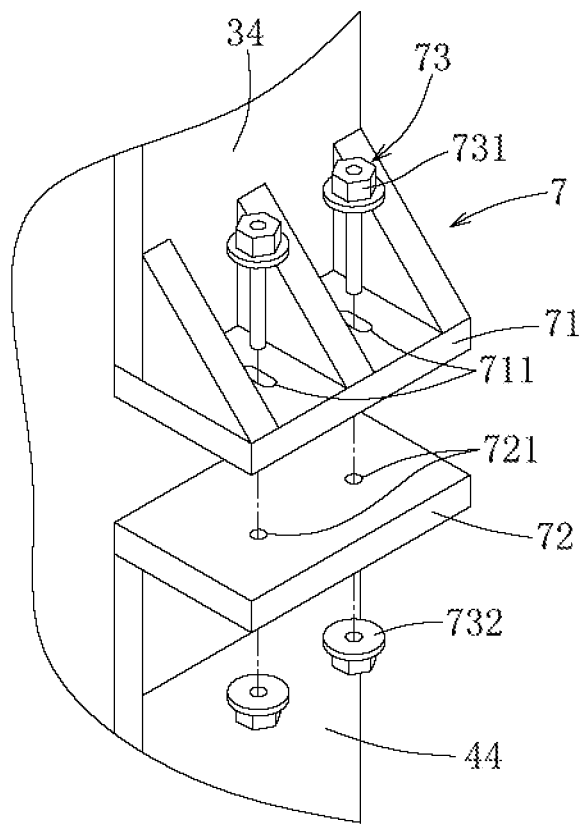
FIG. 13 is a fragmentary exploded perspective view of the second preferred embodiment illustrating a friction damper.
Figure 14:
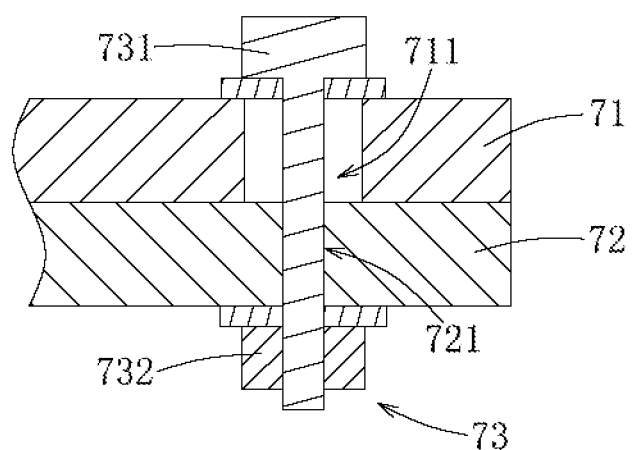
FIG. 14 is a fragmentary sectional view of the second preferred embodiment illustrating the friction damper.

Referring to FIGS. 12 to 14, a second preferred embodiment of the lever viscoelastic damping wall assembly 300 according to the present invention is similar to the first preferred embodiment. The difference between the first and second preferred embodiments resides in that the second preferred embodiment further includes a limiting mechanism 7 that includes two first plates 71, two second plates 72 and a plurality of limiting bolt assemblies 73.

Each of the first plates 71 is soldered to a lower end of a respective one of the reinforcing wall segments 34 of the first wall 3, and is formed with two elongate guide grooves 711 that extend in the first direction (D1).

Each of the second plates 72 is soldered to an upper end of a respective one of the reinforcing wall segments 44 of the second wall 4, and has an upper surface abutting against a lower surface of a respective one of the first plates 71. Each of the second plates 72 is formed with two through holes 721 that correspond respectively in position to the guide grooves 711 of the respective one of the first plates 71.

Each of the limiting bolt assemblies 73 includes a bolt 731, and a nut 732 connected threadedly to one end portion of the bolt 731. The bolt 731 of each of the limiting bolt assemblies 73 extends through one of the through holes 721 of the second plates 72 and the corresponding one of the guide grooves 711 of the first plates 71, and is movable within the corresponding one of the guide grooves 711, such that a relative displacement between the first and second walls 3, 4 is limited by the limiting mechanism 7. Therefore, the limiting mechanism 7 limits the shear deformations of the viscoelastic members 521a, 521b to prevent fractures and failures of the viscoelastic members 521a, 521b.

It is noted that the limiting mechanism 7 may include only one first plate 71 that is formed with one guide grooves 711, one second plate 72 that is formed with one through hole 721, and one bolt assembly 73 that extends through the through hole 721 and the guide grooves 711.

Figure 15:
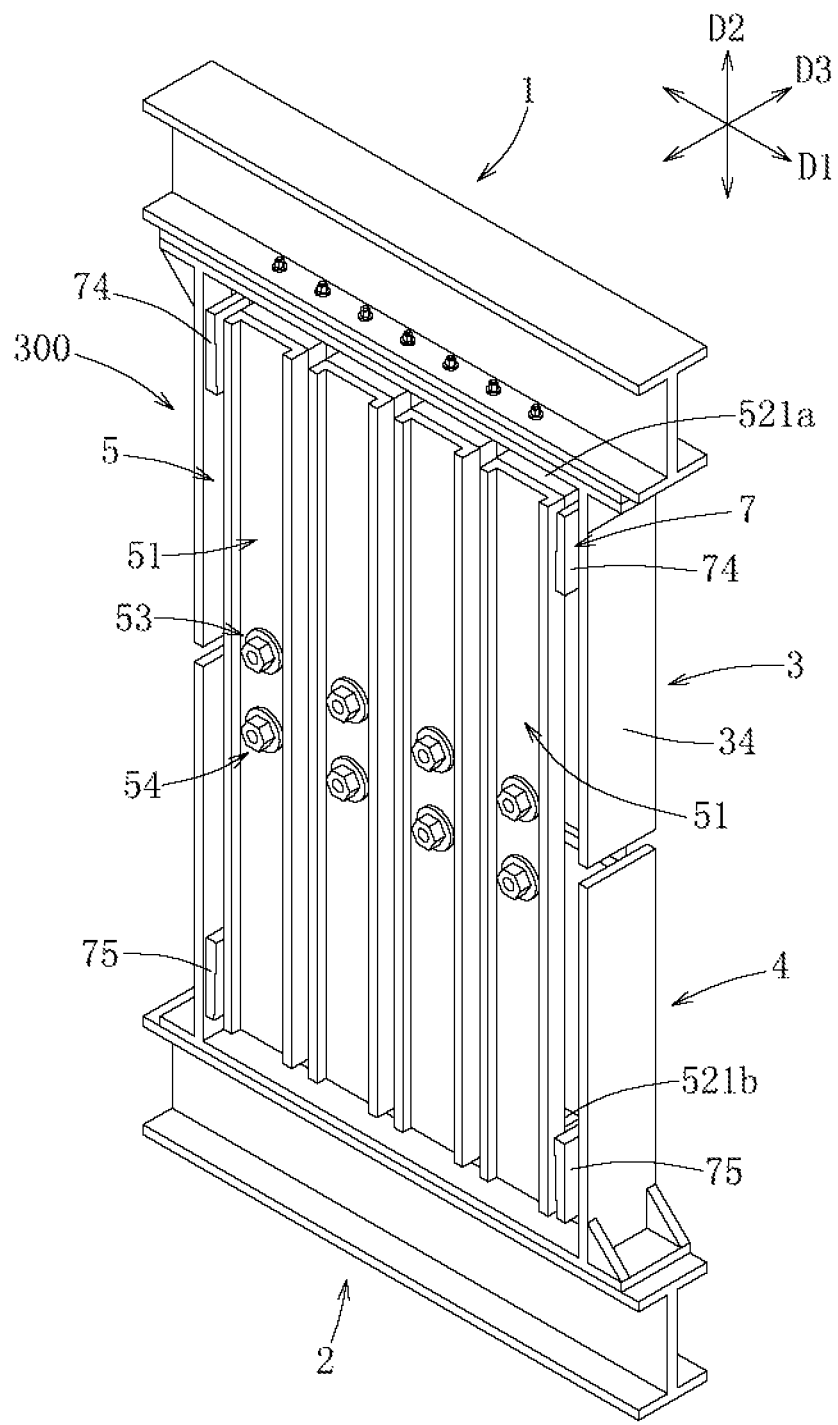
FIG. 15 is a perspective view of a third preferred embodiment of the lever viscoelastic damping wall assembly according to the invention.
Figure 16:
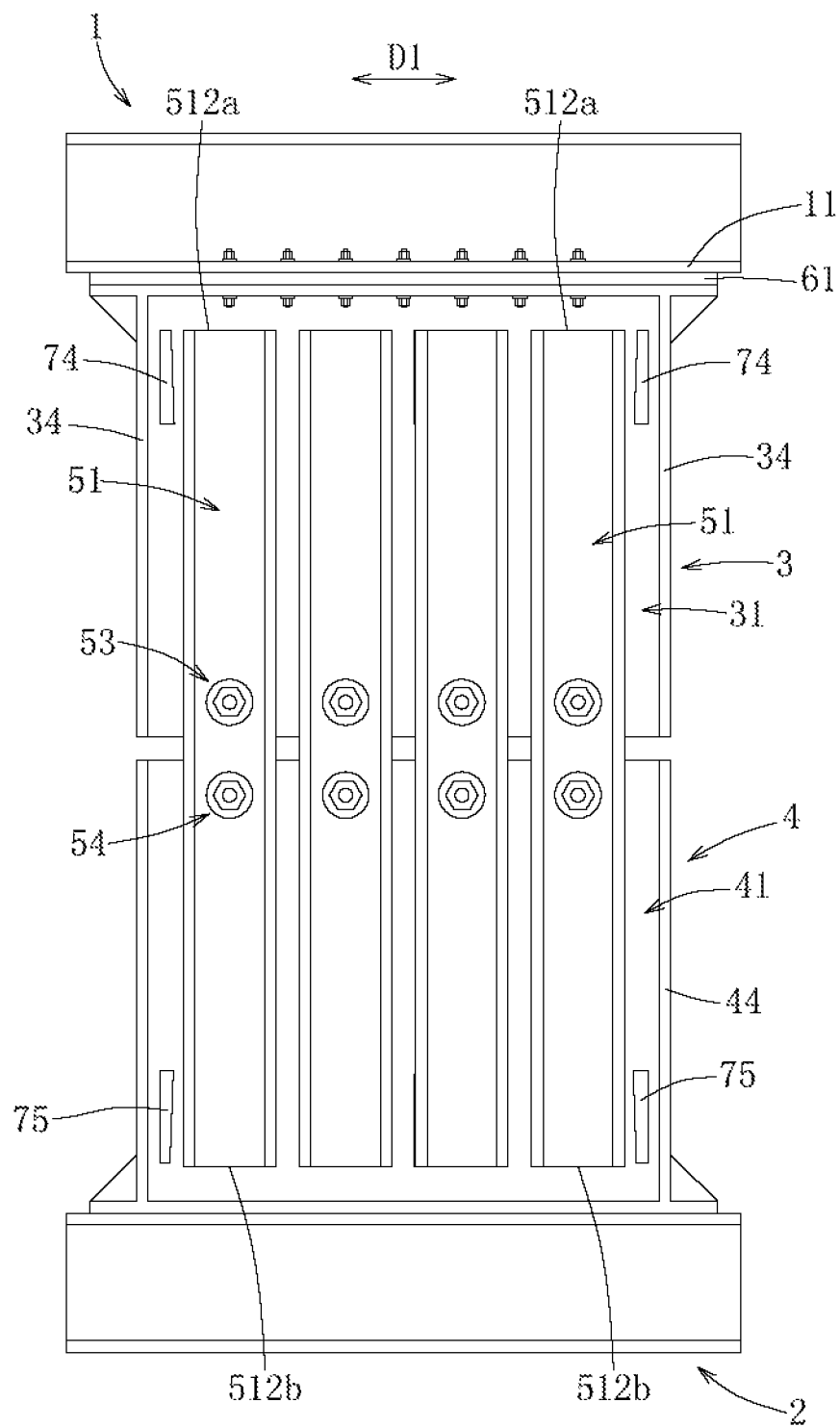
FIG. 16 is a schematic side view of the third preferred embodiment.

Referring to FIGS. 15 and 16, a third preferred embodiment of the lever viscoelastic damping wall assembly 300 according to the present invention is similar to the first preferred embodiment. The difference between the first and third preferred embodiments resides in that the third preferred embodiment further includes a limiting mechanism 7 that includes two pairs of first limiting plates 74 and two pairs of second limiting plates 75 (only one of each pair of the first and second limiting plates 74, 75 is shown in FIGS. 15 and 16).

One pair of the first limiting plates 74 are soldered respectively to the opposite sides of the main wall segment 31 of the first wall 3 in the third direction (D3), and are respectively disposed adjacent to the first end portions 512a of one pair of the swing rods 51 that are proximate to one of the reinforcing wall segments 34 of the first wall 3. The other one pair of the first limiting plates 74 are soldered respectively to the opposite sides of the main wall segment 31 in the third direction (D3), and are respectively disposed adjacent to the first end portions 512a of another one pair of the swing rods 51 that are proximate to the other one of the reinforcing wall segments 34 of the first wall 3.

One pair of the second limiting plates 75 are soldered respectively to the opposite sides of the main wall segment 41 of the second wall 4 in the third direction (D3), and are respectively disposed adjacent to the second end portions 512b of one pair of the swing rods 51 that are proximate to one of the reinforcing wall segments 44 of the second wall 4. The other one pair of the second limiting plates 75 are soldered respectively to the opposite sides of the main wall segment 41 in the third direction (D3), and are respectively disposed adjacent to the second end portions 512b of another one pair of the swing rods 51 that are proximate to the other one of the reinforcing wall segments 44 of the second wall 4.

The rotation of four of the swing rods 51 adjoining to the reinforcing wall segments 34, 44 are stopped by the first and second limiting plates 74, 75 when the four swing rods 51 contact the first and second limiting plates 74, 75. Therefore, the first and second limiting plates 74, 75 cooperatively limit a rotational angle of the swing rods 51 relative to each of the first and second walls 3, 4, so as to limit a relative displacement between the first and second walls 3, 4, and to limit the shear deformations of the viscoelastic members 521a, 521b to prevent fractures and failures of the viscoelastic members 521a, 521b.

It is noted that the limiting mechanism 7 of the third preferred embodiment may include one pair of the first limiting plates 74 that are soldered respectively to the opposite sides of the main well segment 31 of the first wall 3, and one pair of the second limiting plates 75 that are soldered respectively to the opposite sides of the main wall segment 41 of the second wall 4 to limit the rotational angle of the swing rods 51 relative to each of the first and second walls 3, 4.

Figure 17:
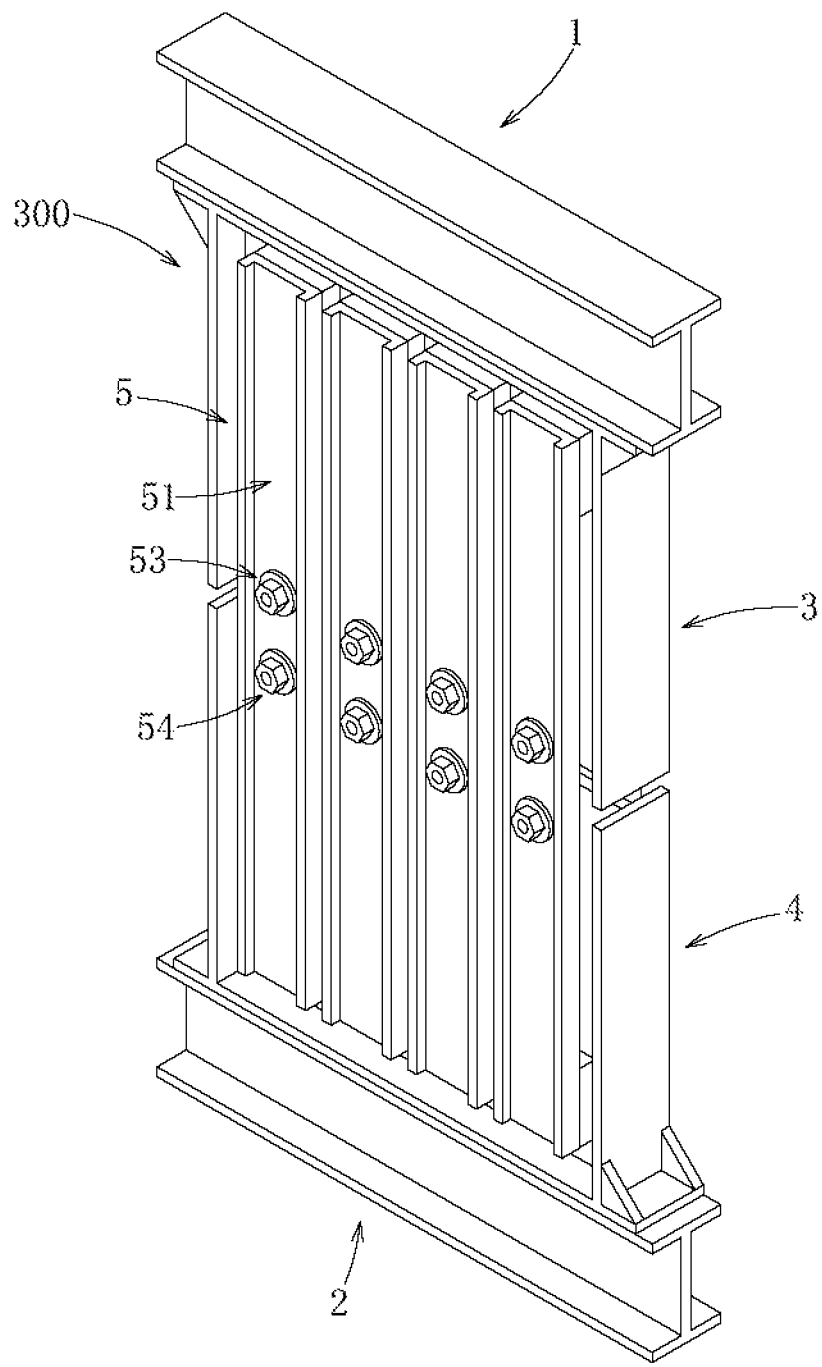
FIG. 17 is a perspective view of a fourth preferred embodiment of the lever viscoelastic damping wall assembly according to the invention.
Figure 18:
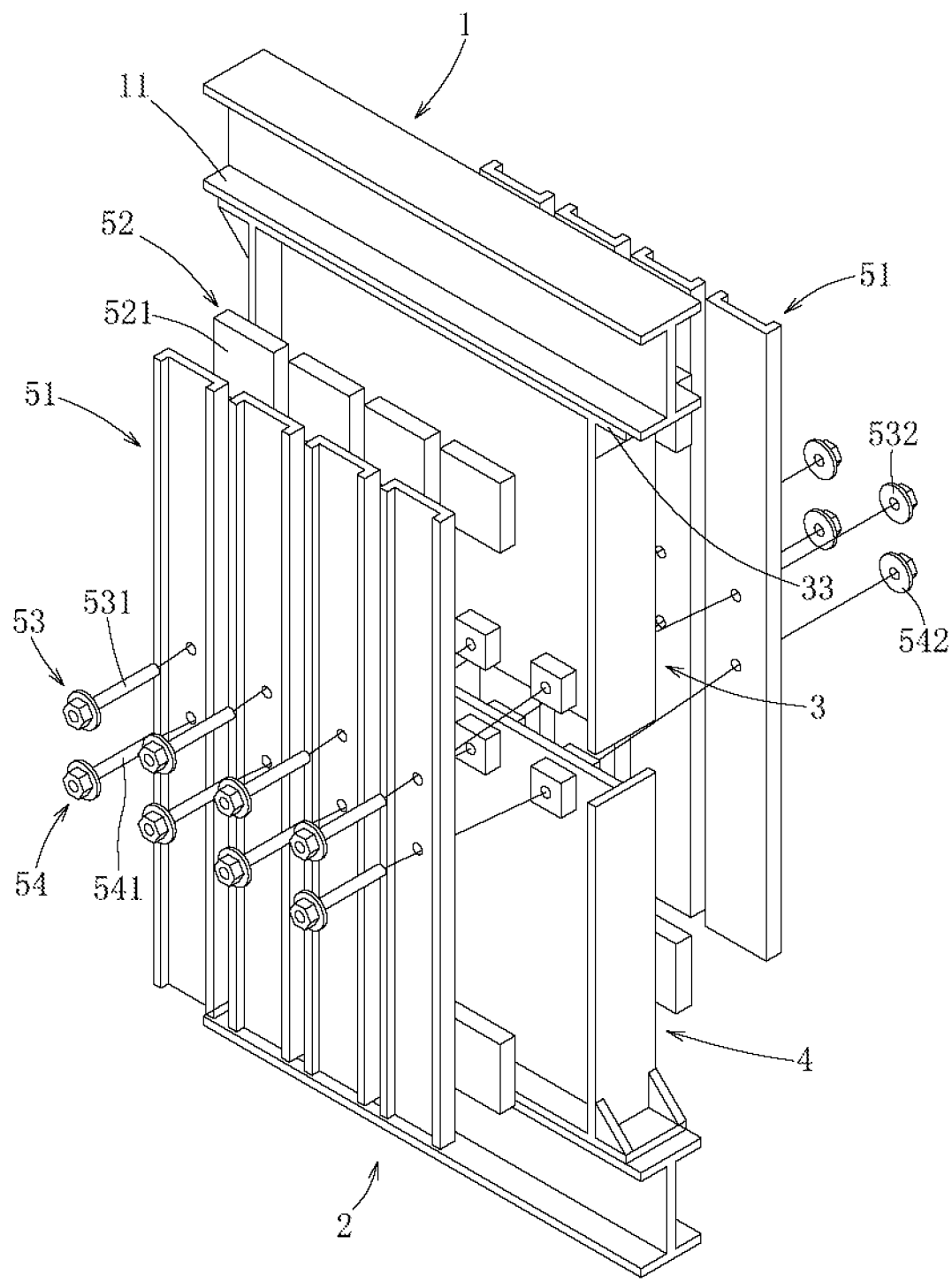
FIG. 18 is an exploded perspective view of the fourth preferred embodiment.

Referring to FIGS. 17 and 18, a fourth preferred embodiment of the lever viscoelastic damping wall assembly 300 according to the present invention is similar to the first preferred embodiment. The difference between the first and fourth preferred embodiments resides in that the friction damper 6 is omitted in the fourth preferred embodiment, and the end wall segment 33 of the first wall 3 is soldered to the lower plate 11 of first structural member 1.

Figure 19:
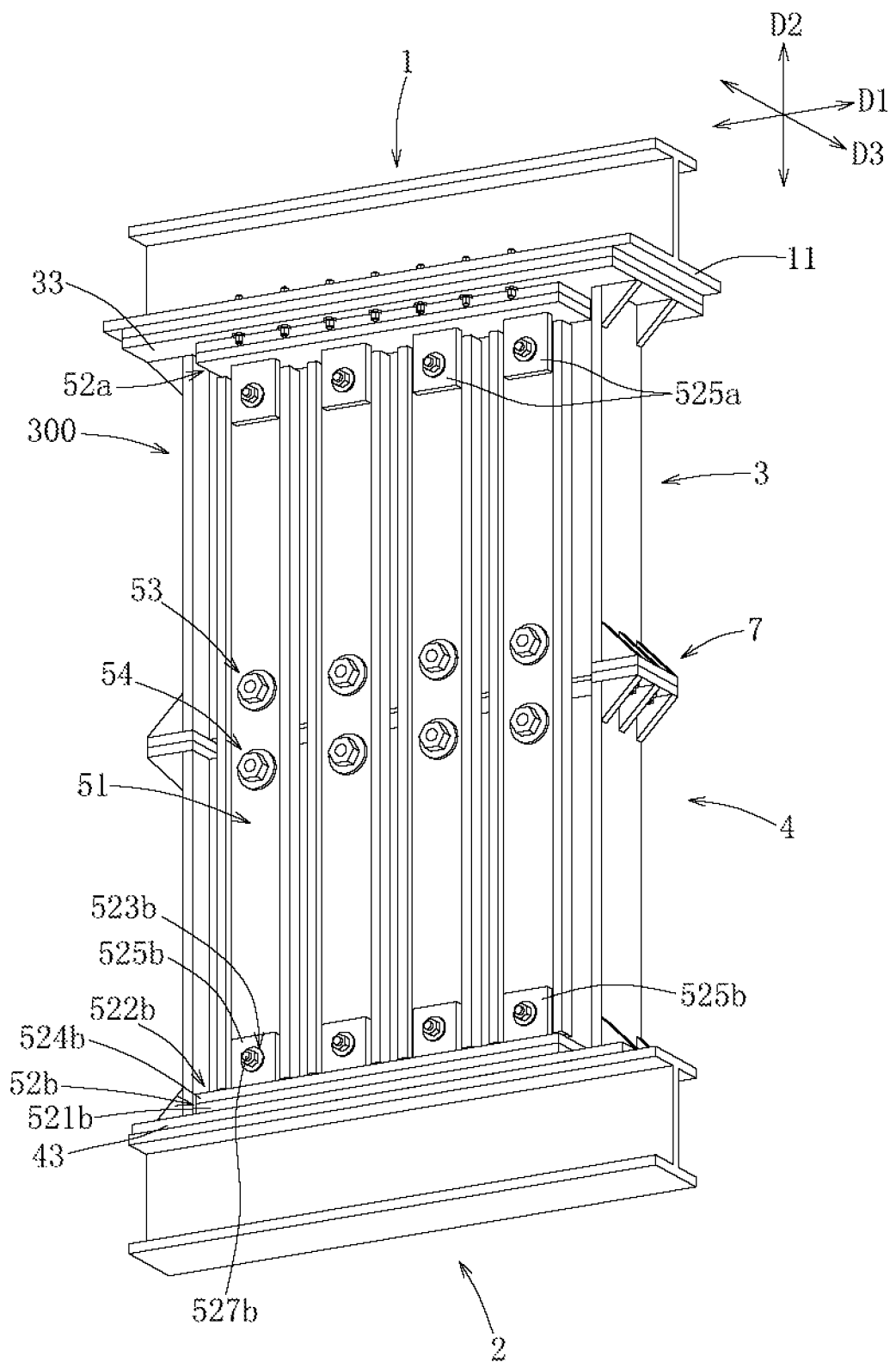
FIG. 19 is a perspective view of a fifth preferred embodiment of the lever viscoelastic damping wall assembly according to the invention.
Figure 20:
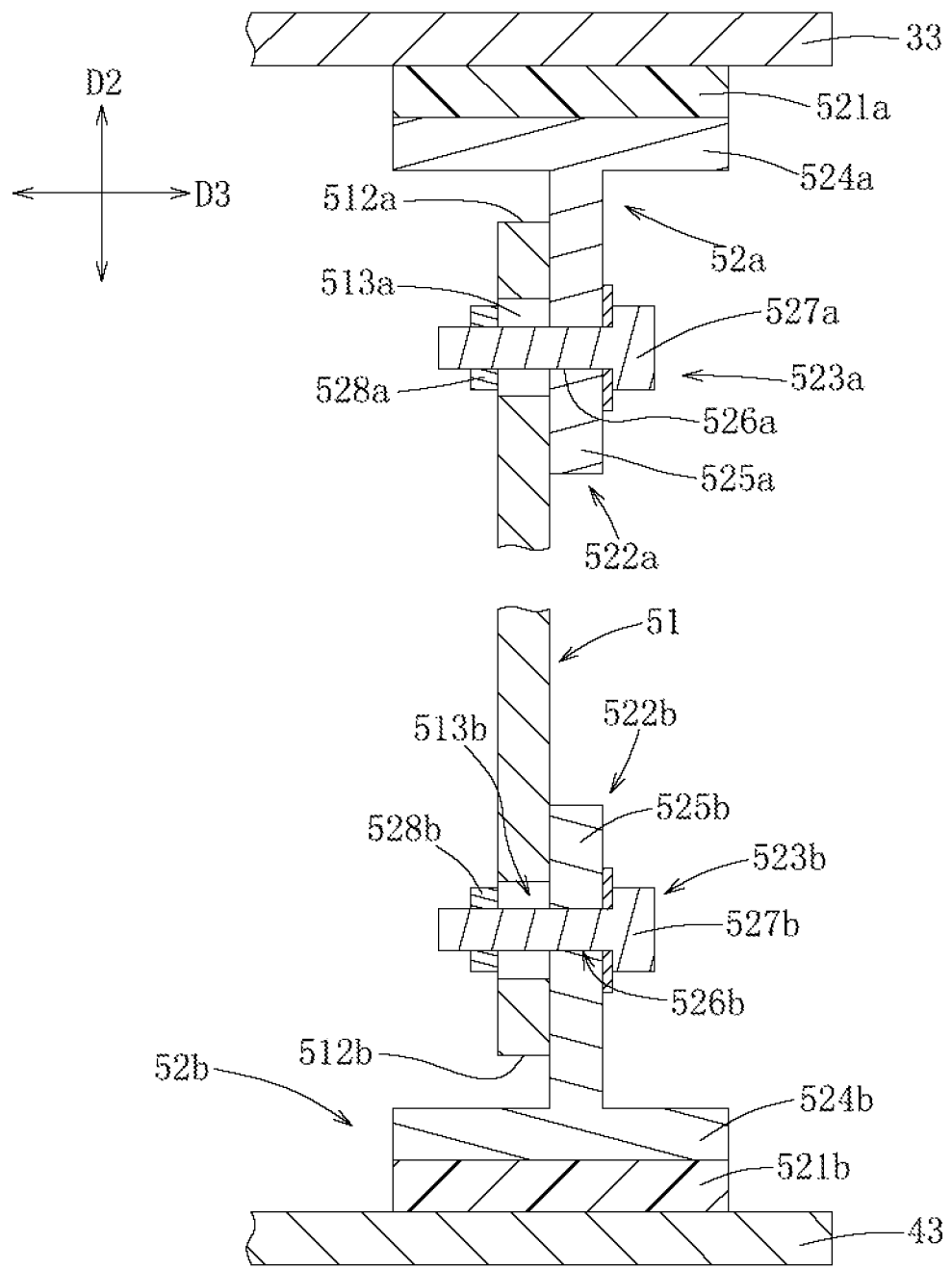
FIG. 20 is a fragmentary sectional view of the fifth embodiment illustrating a viscoelastic damper.

Referring to FIG. 19 and 20, a fifth preferred embodiment of the lever viscoelastic damping wall assembly 300 according to the present invention is similar to the second preferred embodiment. The difference between the fifth and second preferred embodiments resides in the configuration of the viscoelastic damper 5. In this embodiment, the first and second end portions 512a, 512b of each of the swing rods 51 are respectively formed with first and second grooves 513a, 513b that extend in the second direction (D2).

Each of the first viscoelastic units 52a includes a viscoelastic member 521a, a connecting member 522a and a plurality of bolt assemblies 523a.

The viscoelastic member 521a of each of the first viscoelastic units 52a is connected fixedly to one side of the end wall segment 33 of the first wall 3 opposite to the lower plate 11 of first structural member 1.

The connecting member 522a of each of the first viscoelastic units 52a includes a plate segment 524a that is connected fixedly to one side of the viscoelastic member 521a opposite to the end wall segment 33 of the first wall 3, and a plurality of connecting segments 525a that extend from one side of the plate segment 524a opposite to the viscoelastic member 521a, and that are spaced apart from each other in the first direction (D1). Each of the connecting segments 525a is formed with a pivot hole 526a.

Each of the bolt assemblies 523a of the first viscoelastic units 52a includes a bolt 527a, and a nut 528a connected threadedly to an end portion of the bolt 527a. The bolt 527a of each of the bolt assemblies 523a extends through the pivot hole 526a of a respective one of the connecting segments 525a of the first viscoelastic units 52a and the first groove 513a of a respective one of the swing rods 51 to interconnect pivotally the respective one of the connecting segments 525a and the first end portion 512a of the respective one of the swing rods 51.

Likewise, each of the second viscoelastic units 52b includes a viscoelastic member 521b, a connecting member 522b end a plurality of bolt assemblies 523b.

The viscoelastic member 521b of each of the second viscoelastic units 52b is connected fixedly to one side of the end wall segment 43 of the second wall 4 opposite to the second structural member 2.

The connecting member 522b of each of the second viscoelastic units 52b includes a plate segment 524b that is connected fixedly to one side of the viscoelastic member 521b opposite to the end wall segment 43 of the second wall 4, and a plurality of connecting segments 525b that extend from one side of the plate segment 524b opposite to the viscoelastic member 521b, and that are spaced apart from each other in the first direction (D1). Each of the connecting segments 525b is formed with a pivot hole 526b.

Each of the bolt assemblies 523b of the second viscoelastic units 52b includes a bolt 527b, and a nut 528b connected threadedly to an end portion of the bolt 527b. The bolt 527b of each of the bolt assemblies 523b extends through the pivot hole 526b of a respective one of the connecting segments 525b of the second viscoelastic units 52b and the second groove 513b of a respective one of the swing rods 51 to interconnect pivotally the respective one of the connecting segments 525a and the second end portion 512b of the respective one of the swing rods 51.

When the swing rods 51 are driven to pivot relative to the first and second walls 3, 4, the connecting member 522a, 522b of each of the first and second viscoelastic units 52a, 52b is driven to move relative to the corresponding one of the end wall segments 33, 43 of the first and second wall 3, 4, so as to generate shear deformations of the viscoelastic members 521a, 521b to damp the relative movement between the first and second structural member 1, 2.

Figure 21:
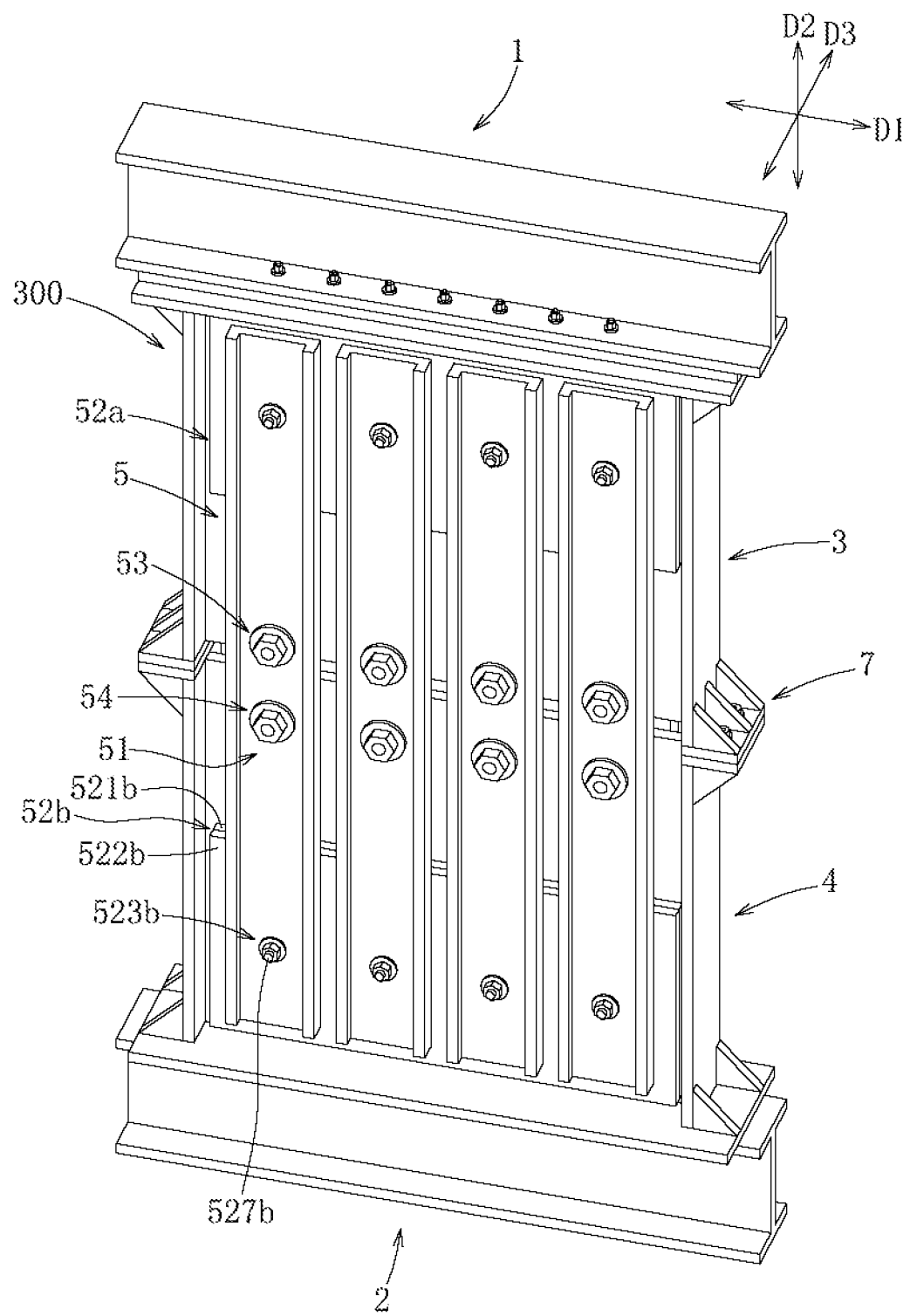
FIG. 21 is a perspective view of a sixth preferred embodiment of the lever viscoelastic damping wall assembly according to the invention.
Figure 22:
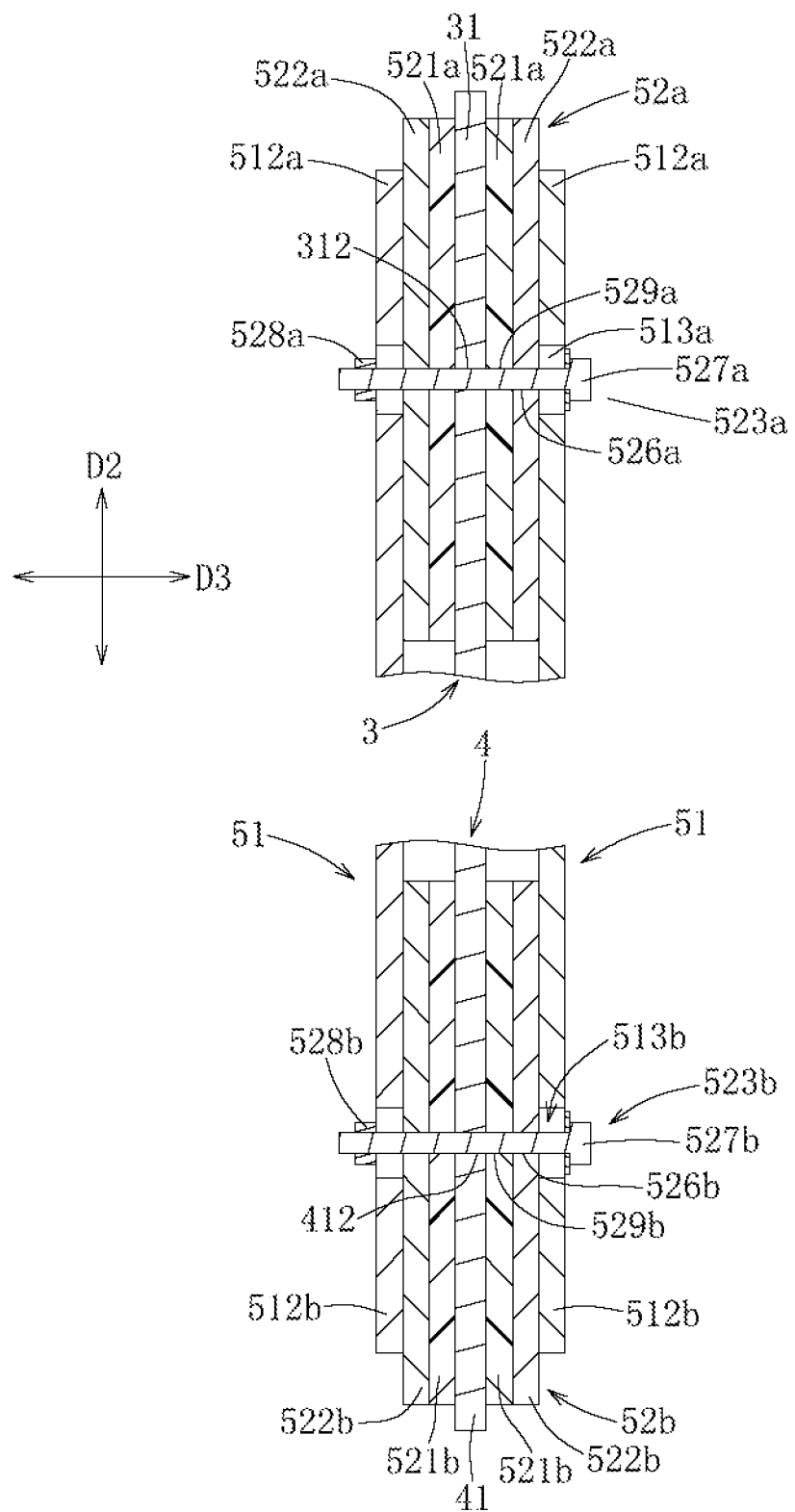
FIG. 22 is a fragmentary sectional view of the sixth embodiment illustrating a viscoelastic damper.
Figure 23:
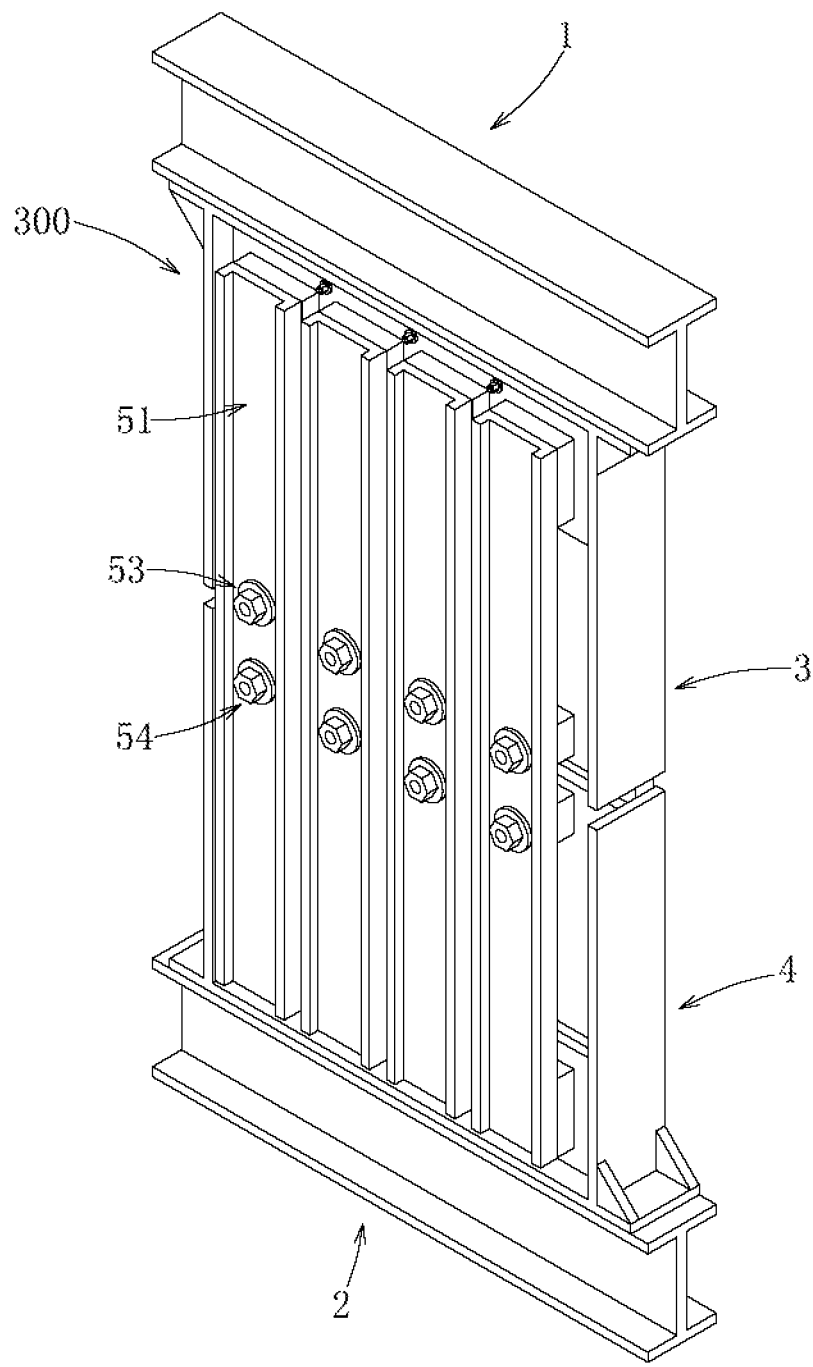
FIG. 23 is a perspective view of a seventh preferred embodiment of the lever viscoelastic damping wall assembly according to the invention.
Figure 24:
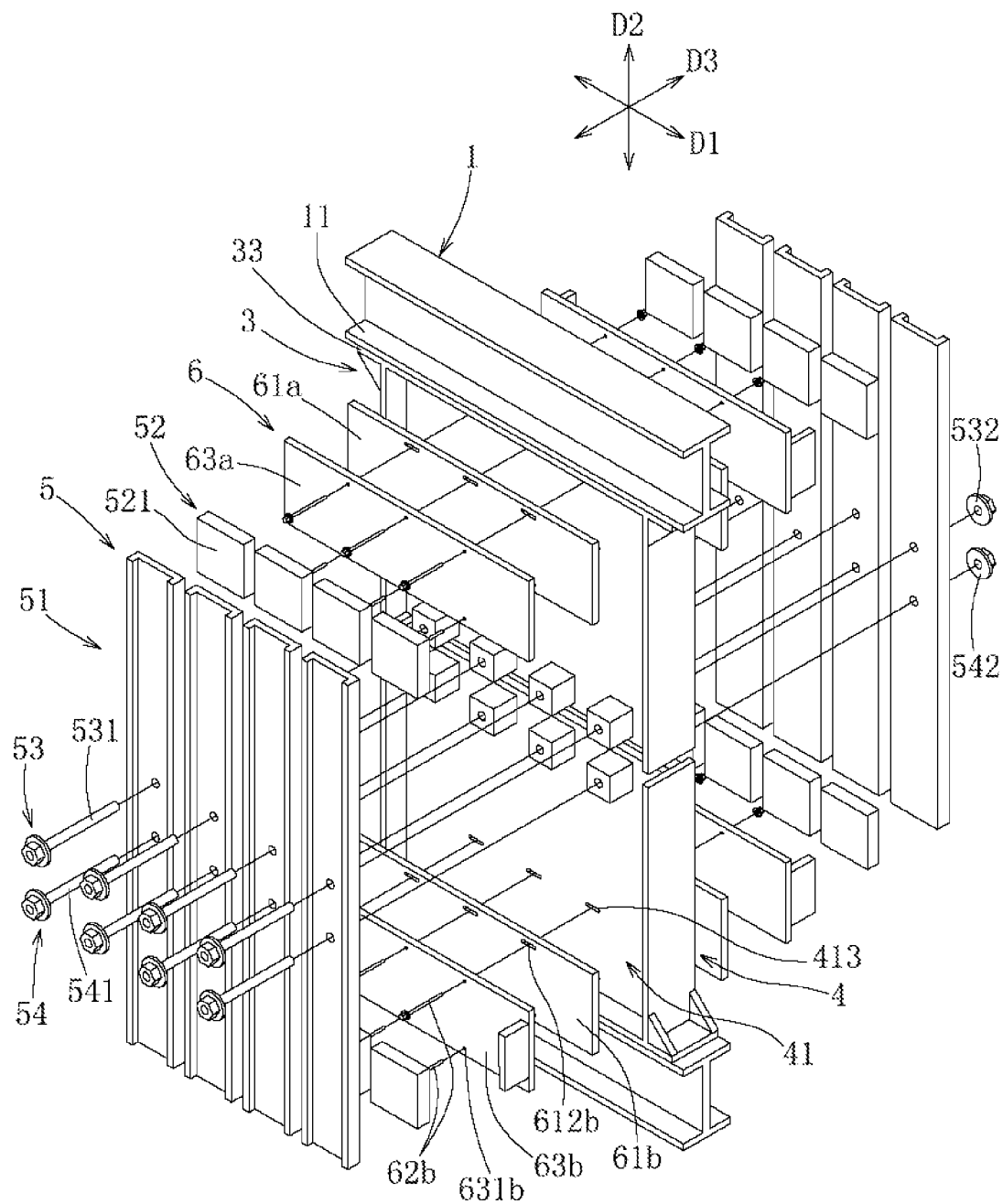
FIG. 24 is an exploded perspective view of the seventh preferred embodiment.
Figure 25:
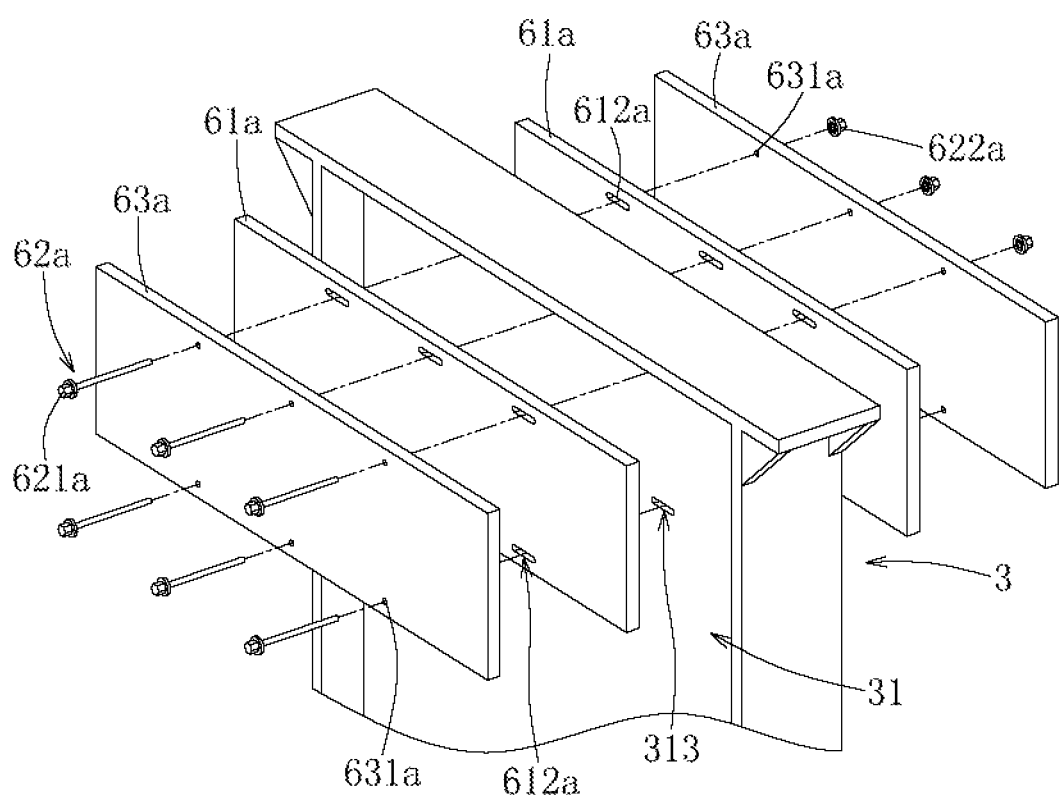
FIG. 25 is an exploded perspective view illustrating a friction damper of the seventh preferred embodiment.

Referring to FIGS. 21 and 22, a sixth preferred embodiment of the lever viscoelastic damping wall assembly 300 according to the present invention is similar to the second preferred embodiment. The difference between the sixth and second preferred embodiments resides in the configuration of the viscoelastic damper 5. In this embodiment, the first and second end portions 512a, 512b of each of the swing rods 51 are respectively formed with first and second grooves 513a, 513b that extend in the second direction (D2).

The viscoelastic damper 5 of the sixth preferred embodiment includes only one first viscoelastic unit 52a and only one second viscoelastic units 52b.

The first viscoelastic unit 52a includes a pair of viscoelastic members 521a, a pair of connecting members 522a and a plurality of bolt assemblies 523a. The main wall segment 31 of the first wall 3 is formed with a plurality of grooves 312, each of which extends in the first direction (D1). The grooves 312 are spaced apart from each other in the first direction (D1).

Each of the viscoelastic members 521a of the first viscoelastic unit 52a is connected fixedly to a respective one of the opposite sides of the main wall segment 31 of the first wall 3 in the third direction (D3), and is formed with a plurality of grooves 529a, each of which extends in the first direction (D1) and is registered with a respective one of the grooves 312 of the main wall segment 31 of the first wall 3.

Each of the connecting members 522a of the first viscoelastic unit 52a is connected fixedly to one side of a respective one of the viscoelastic members 521a opposite to the main wall segment 31 of the first wall 3, and is formed with a plurality of pivot holes 526a that correspond respectively to the grooves 529a of the respective one of the viscoelastic member 521a.

Each of the bolt assemblies 523a of the first viscoelastic unit 52a includes a bolt 527a, and a nut 528a connected threadedly to an end portion of the bolt 527a. The bolt 527a of each of the bolt assemblies 523a extends through a respective one of the grooves 312 of the main wall segment 31 of the first wall 3, the respective ones of the grooves 529a of the viscoelastic members 521a, the respective ones of the pivot holes 526a of the connecting members 521a, and the first grooves 513a of a respective pair of the swing rods 51 to interconnect pivotally the connecting members 522a and the first end portions 512a of the respective pair of the swing rods 51.

Likewise, the second viscoelastic unit 52b includes a pair of viscoelastic members 521b, a pair of connecting members 522b and a plurality of bolt assemblies 523b. The main wall segment 41 of the second wall 4 is formed with a plurality of grooves 412, each of which extends in the first direction (D1). The grooves 412 are spaced apart from each other in the first direction (D1).

Each of the viscoelastic members 521b of the second viscoelastic unit 52b is connected fixedly to a respective one of the opposite sides of the main wall segment 41 of the second wall 4 in the third direction (D3), and is formed with a plurality of grooves 529b, each of which extends in the first direction (D1) and is registered with a respective one of the grooves 412 of the main wall segment 41 of the second wall 4.

Each of the connecting members 522b of the second viscoelastic unit 52b is connected fixedly to one side of a respective one of the viscoelastic members 521b opposite to the main wall segment 41 of the second wall 4, and is formed with a plurality of pivot holes 526b that correspond respectively to the grooves 529b of the respective one of the viscoelastic member 521b.

Each of the bolt assemblies 523b of the second viscoelastic unit 32b includes a bolt 527b, and a nut 523b connected threadedly to an end portion of the bolt 527b. The bolt 527b of each of the bolt assemblies 523b extends through a respective one of the grooves 412 of the main wall segment 41 of the second wall 4, the respective ones of the grooves 529b of the viscoelastic members 521b, the respective ones of the pivot holes 526b of the connecting members 522b, and the second grooves 513b of a respective pair of the swing rods 51 to interconnect pivotally the connecting members 522b and the second end portions 512b of the respective pair of the swing rods 51.

When the swing rods 51 are driven to pivot relative to the first and second walls 3, 4, the connecting members 522a, 522b of each of the first and second viscoelastic units 52a, 52b are driven to move relative to the corresponding one of the main wall segments 31, 41 of the first and second wall 3, 4, so as to generate shear deformations of the viscoelastic members 521a, 521b to damp the relative movement between the first and second structural members 1, 2.

It is noted that, in this embodiment, the grooves 312 of the main wall segment 31 of the first wall 3, the grooves 529a of the viscoelastic members 521a, the grooves 412 of the main wall segment 41 of the second wall 4 and the grooves 529b of the viscoelastic members 521b can be omitted. In this case, the first end portions 512a of a respective pair of the swing rods 51 can be connected pivotally and respectively to the connecting members 522a of the first viscoelastic unit 52a by two bolts, respectively, and the second end portions 512b of a respective pair of the swing rods 51 can be connected pivotally and respectively to the connecting members 522b of the second viscoelastic unit 52b by two bolts, respectively.

Referring to FIGS. 23 to 27, a seventh preferred embodiment of the lever viscoelastic damping wall assembly 300 according to the present invention is similar to the fourth preferred embodiment. The difference between the seventh and fourth preferred embodiments resides in that the seventh preferred embodiment further includes a friction damper 6. Each of the main wall segments 31, 41 of the first and second wall 3, 4 is formed with a plurality of elongate grooves 313, 413. Each of the elongate grooves 313, 413 extends in the first direction (D1).

The friction damper 6 of the seventh preferred embodiment includes two first friction plates 61a, two second friction plates 61b, two first connecting plates 63a, two second connecting plates 63b, a plurality of first bolt assemblies 52a and a plurality of second bolt assemblies 62b.

The first friction plates 61a are connected fixedly and respectively to the two sides of the first wall 3. Each of the first friction plates 61a is formed with a plurality of elongate grooves 612a, each of which extends in the first direction (D1). The elongate grooves 612a of each of the first friction plates 61a are registered respectively with the elongate grooves 313 of the main wall segment 31 of the first wall 3.

The second friction plates 61b are connected fixedly and respectively to the two sides of the second wall 4. Each of the second friction plates 61b is formed with a plurality of elongate grooves 612b, each of which extends in the first direction (D1). The elongate grooves 612b of each of the second friction plates 61b are registered respectively with the elongate grooves 413 of the main wall segment 41 of the second wall 4.

Each of the first connecting plates 63a has a side abutting against one side of a respective one of the first friction plates 61a opposite to the first wall 3, and an opposite side connected to a respective one of the first viscoelastic units 32a, and is formed with a plurality of through holes 631a.

Each of the second connecting plates 63b has a side abutting against one side of a respective one of the second friction plates 61b opposite to the second wall 4, and an opposite side connected to a respective one of the second viscoelastic units 52*b*, and is formed with a plurality of through holes 631*b*.

Each of the first bolt assemblies 62*a* includes a bolt 621*a* and a nut 622*a* connected threadedly to an end portion of the bolt 621*a*.

The bolt 621*a* of each of the first bolt assemblies 62*a* extends through a respective one of the through holes 631*a* of one of the first connecting plates 63*a*, a respective one of the through holes 631*a* of the other one of the first connecting plates 63*a*, a respective one of the elongate grooves 612*a* of one of the first friction plates 61*a*, the respective one of the elongate grooves 313 of the main wall segment 31 of the first wall 3 and the respective one of the elongate grooves 612*a* of the other one of the first friction plates 61*a*, and is movable along the respective one of the elongate grooves 612*a* of the one the first friction plates 61*a*, the respective one of the elongate grooves 313 of the main wall segment 31 of the first wall 3 and the respective one of the elongate grooves 612*a* of the other one of the first friction plates 61*a*, such that the first connecting plates 63*a* and the first viscoelastic units 52*a* are movable frictionally relative to the first friction plates 61*a* when an external force driving the relative movement between the first and second structural members 1, 2 exceeds a sum of a maximum static friction between one of the first connecting plates 63*a* and the respective one of the first friction plates 61*a* and a maximum static friction between the other one of the first connecting plates 63*a* and the respective one of the first friction plates 61*a*, so as to damp the relative movement between the first and second structural members 1, 2.

Each of the second bolt assemblies 62*b* includes a bolt 621*b* and a nut 622*b* connected threadedly to an end portion of the bolt 621*b*.

The bolt 621*b* of each of the second bolt assemblies 62*b* extends through a respective one of the through holes 631*b* of one of the second connecting plates 63*b*, a respective one of the through holes 631*b* of the other one of the second connecting plates 63*b*, a respective one of the elongate grooves 612*b* of one of the second friction plates 61*b*, the respective one of the elongate grooves 413 of the main wall segment 41 of the second wall 4 and the respective one of the elongate grooves 612*b* of the other one of the second friction plates 61*b*, and is movable along the respective one of the elongate grooves 612*b* of the one the second friction plates 61*b*, the respective one of the elongate grooves 413 of the main wall segment 41 of the second wall 4 and the respective one of the elongate grooves 612*b* of the other one of the second friction plates 61*b*, such that the second connecting plates 63*b* and the second viscoelastic units 52*b* are movable frictionally relative to the second friction plates 61*b* when the external force driving the relative movement between the first and second structural members 1, 2 exceeds a sum of a maximum static friction between one of the second connecting plates 63*b* and the respective one of the second friction plates 61*b* and a maximum static friction between the other one of the second connecting plates 63*b* and the respective one of the second friction plates 61*b*, so as to damp the relative movement between the first and second structural members 1, 2.

It is noted that the friction damper 6 in this embodiment may include only one of the first and second friction plates 61*a*, 61*b*, and only one of the first and second connecting plates 63*a*, 63*b* that corresponds to the one of the first and second friction plates 61*a*, 61*b*, which also can work without failing to damp the relative movement between the first and second structural members 1, 2.

Figure 26:
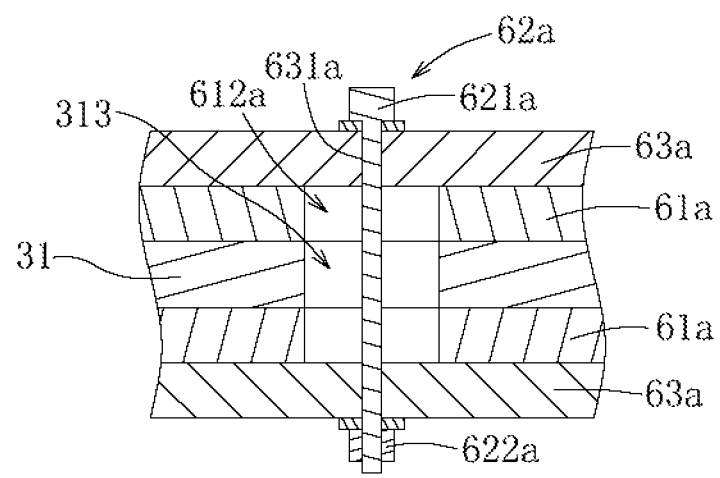
FIG. 26 is a fragmentary section view of the seventh preferred embodiment illustrating the friction damper.
Figure 27:
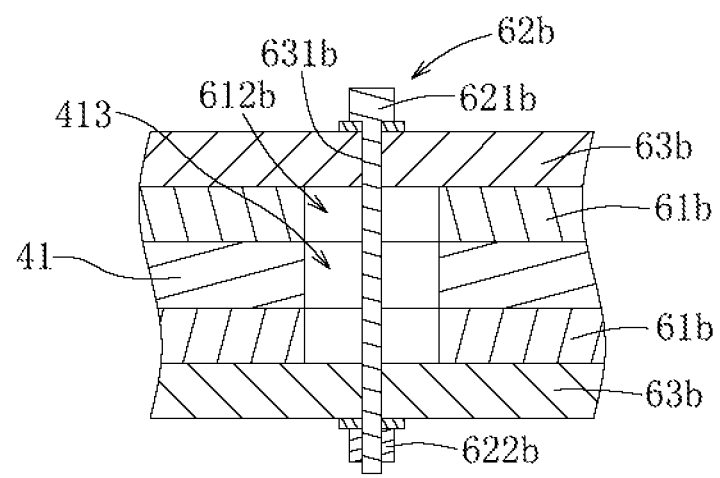
FIG. 27 is another fragmentary section view of the seventh preferred embodiment illustrating the friction damper.
Figure 28:
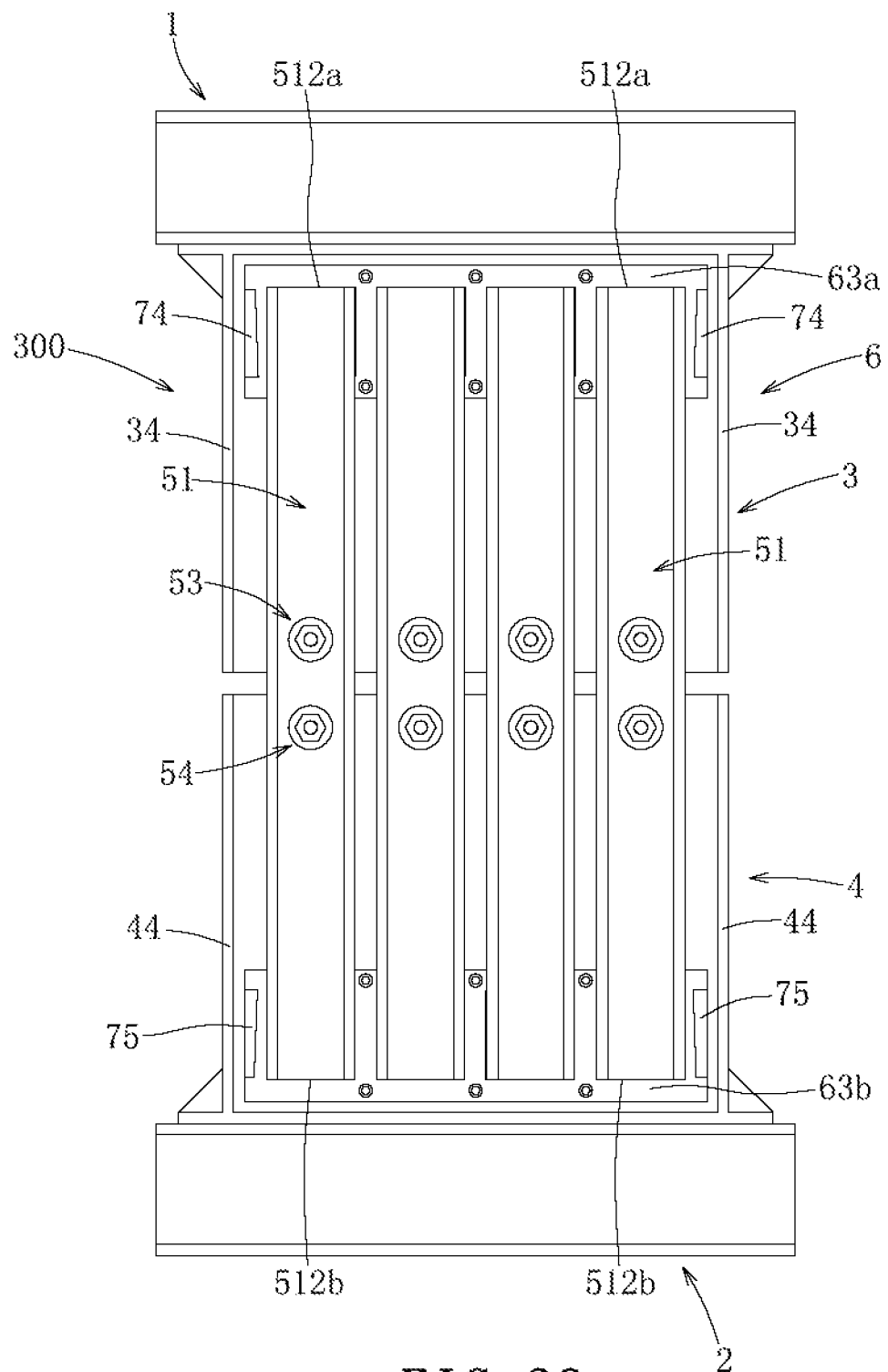
FIG. 28 is a side view of an eighth preferred embodiment of the lever viscoelastic damping wall assembly according to the invention.
Figure 29:
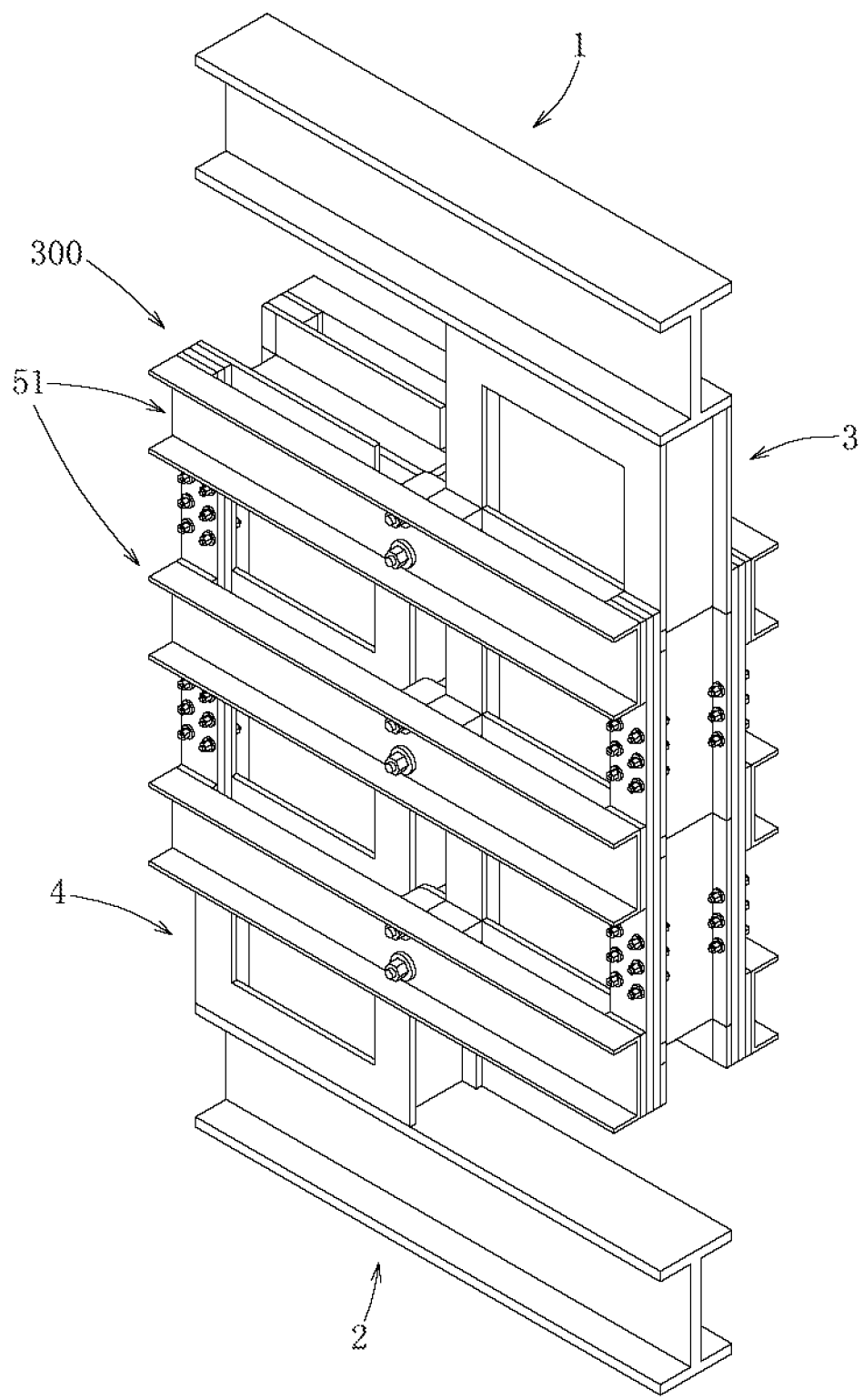
FIG. 29 is a perspective view of a ninth preferred embodiment of the lever viscoelastic damping wall assembly according to the invention.
Figure 30:
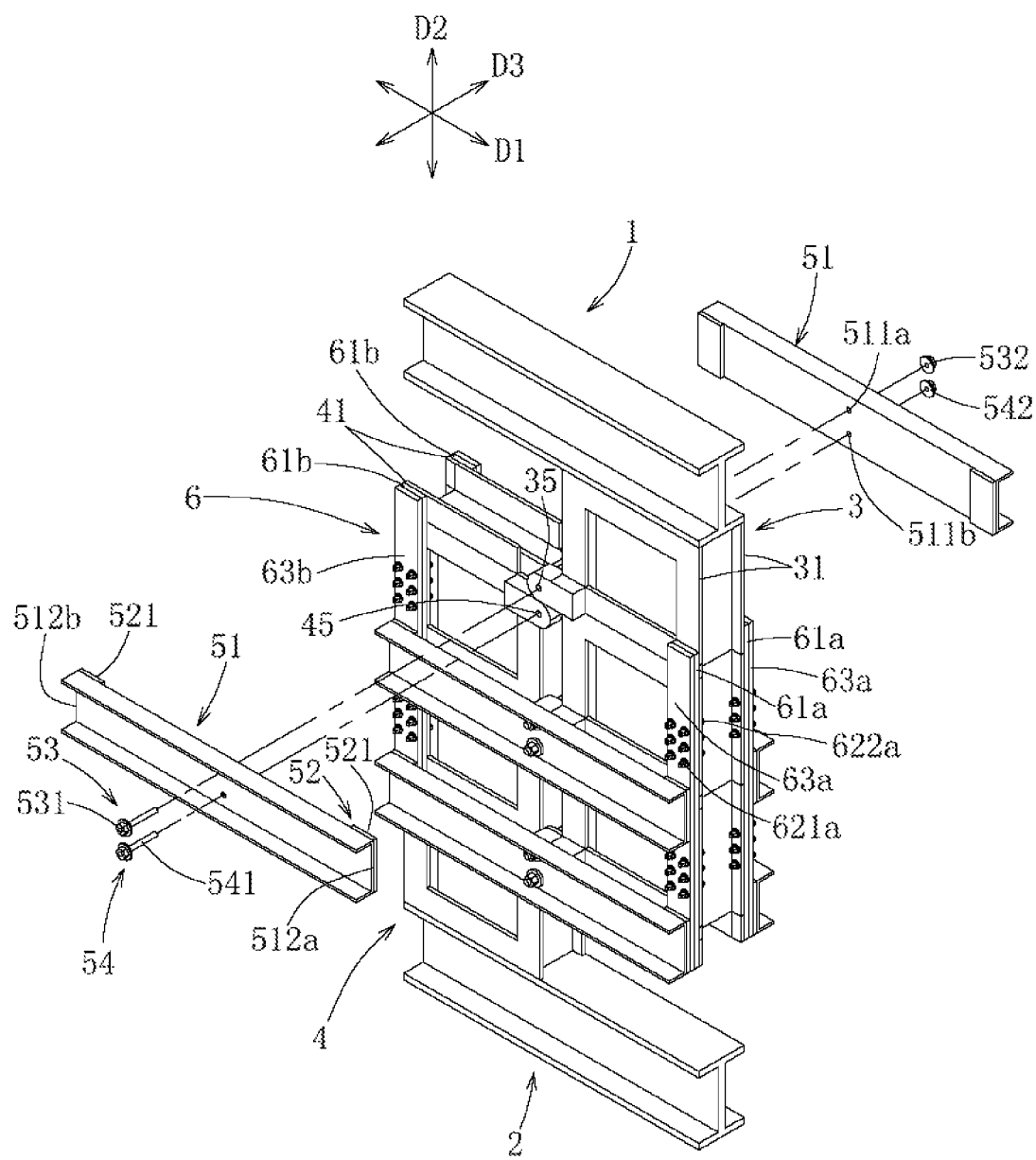
FIG. 30 is a partly exploded perspective view of the ninth preferred embodiment.

Referring to FIG. 26, an eighth preferred embodiment of the lever viscoelastic damping wall assembly 300 according to the present invention is similar to the seventh preferred embodiment. The difference between the eighth and seventh preferred embodiments resides in that the eighth preferred embodiment further includes a limiting mechanism 7 that includes two pairs of first limiting plates 74 and two pairs of second limiting plates 75.

One pair of the first limiting plates 74 are soldered respectively to the first connecting plates 63*a* of the friction damper 6, and are respectively disposed adjacent to the first end portions 512*a* of one pair of the swing roots 51 that are proximate to one of the reinforcing wall segments 34 of the first wall 3. The other one pair of the first limiting plates 74 are soldered respectively to the first connecting plates 63*a* of the friction damper 6, and are respectively disposed adjacent to the first end portions 512*a* of another one pair of the swing rods 51 that are proximate to the other one of the reinforcing wall segments 34 of the first wall 3.

One pair of the second limiting plates 75 are soldered respectively to the second connecting plates 63*b* of the friction damper 6, and are respectively disposed adjacent to the second end portions 512*b* of one pair of the swing rods 51 that are proximate to one of the reinforcing wall segments 44 of the second wall 4. The other one pair of the second limiting plates 75 are soldered respectively to the second connecting plates 63*b* of the friction damper 6, and are respectively disposed adjacent to the second end portions 512*b* of another one pair of the swing rods 51 that are proximate to the other one of the reinforcing wall segments 44 of the second wall 4.

Four of the swing rods 51 adjoining the reinforcing wall segments 34, 44 are rotatable to contact the first and second limiting plates 74, 75 by the relative movement between the first and second structural members 1, 2. Upon further relative movement between the first and second structural members 1, 2, the four swing rods 51 are further driven to rotate relative to the first and second walls 3, 4 to push the first and second limiting plates 74, 75, so as to drive a relative movement between the first connecting plates 63*a* and the first wall 3 which is damped by the first friction plates 61*a*, and a relative movement between the second connecting plates 63*b* and the second wall 4 which is damped by the second friction plates 61*b*. Therefore, the relative movement between the first and second structural members 1, 2 is damped by the viscoelastic damper 5 and the friction damper 6.

FIGS. 29 to 32 show a ninth preferred embodiment of the lever viscoelastic damping wall assembly 300 according to the present invention. In this embodiment, each of the swing rods 51 extends in the first direction (D1), and the first and second extending holes 511*a*, 511*b* of the middle portion of each of the swing rods 51 are spaced apart from each other in the second direction (D2).

Figure 31:
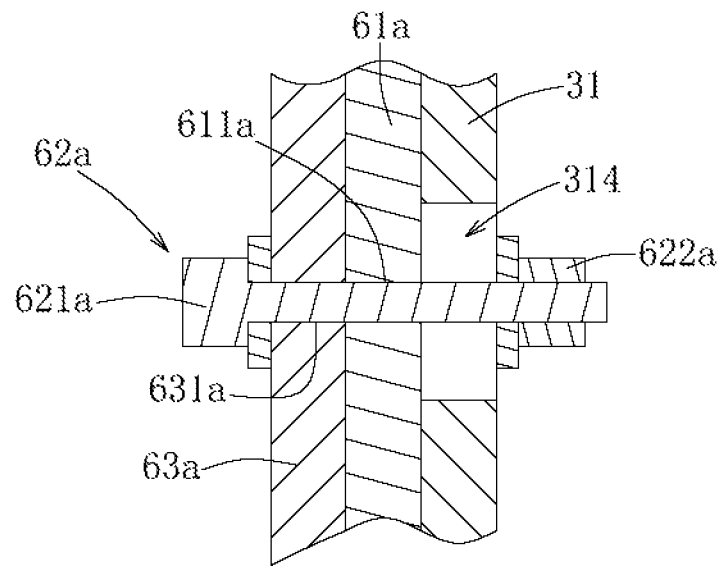
FIG. 31 is a fragmentary section view of the ninth preferred embodiment illustrating a friction damper.
Figure 32:
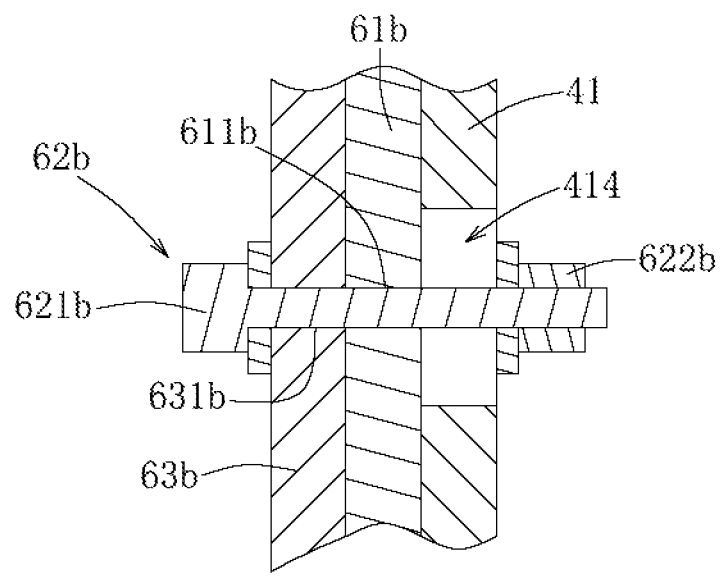
FIG. 32 is another fragmentary section view of the ninth preferred embodiment illustrating the friction damper.

Each of the first and second walls 3, 4 has two main wall segments 31, 41 that are spaced apart from each other in the third direction (D3). Each of the main wall segments 31, 41 of the first and second walls 3, 4 is formed with a plurality of elongate grooves 314, 414 (only one is shown in FIGS. 31 and 32). Each of the elongate grooves 314, 414 extends in the second direction (D2).

The friction damper 6 of the ninth preferred embodiment includes two first friction plates 61*a*, two second friction plates 61*b*, two first connecting plates 63*a*, two second connecting plates 63*b*, a plurality of first bolt assemblies 62*a* and a plurality of second bolt assemblies 62*b*.

The first friction plates 61*a* respectively abut against the main wall segments 31 of the first wall 3. Each of the first friction plates 61*a* is formed with a plurality of through holes 611*a*. The through holes 611*a* of each of the first friction plates 61a correspond respectively in position to the elongate grooves 314 of the respective one of the main wall segments 31 of the first wall 3.

The second friction plates 61b respectively abut against the main wall segments 41 of the second wall 4. Each of the second friction plates 61b is formed with a plurality of through holes 611b. The through holes 611b of each of the second friction plates 61b correspond respectively in position to the elongate grooves 413 of the respective one of the main wall segments 41 of the second wall 4.

Each of the first connecting plates 63a has a side abutting against one side of a respective one of the first friction plates 61a opposite to the first wall 3, and an opposite side connected to a respective one of the first viscoelastic units 52a, and is formed with a plurality of through holes 631a.

Each of the second connecting plates 63b has a side abutting against one side of a respective one of the second friction plates 61b opposite to the second wall 4, and an opposite side connected to a respective one of the second viscoelastic units 52b, and is formed with a plurality of through holes 631b.

Each of the first bolt assemblies 62a includes a bolt 621a and a nut 622a connected threadedly to an end portion of the bolt 621a.

The bolt 621a of each of the first bolt assemblies 62a extends through a respective one of the through holes 631a of the first connecting plates 63a, a respective one of the through holes 611a of the first friction plates 61a and the respective one of the elongate grooves 314 of the main wall segments 31 of the first wall 3, and is movable along the respective one of the elongate grooves 314 of the main wall segments 31 of the first wall 3, such that the first friction plates 61a, the first connecting plates 63a and the first viscoelastic units 52a are movable frictionally relative to the first wall 3 in the second direction (D2) when a resulting force that results from an external force driving the relative movement between the first and second structural members 1, 2 and that is exerted at the first end portions 512a of the swing rods 51 in the second direction (D2) exceeds a sum of a maximum static friction between one of the main wall segments 31 of the first wall 3 and the respective one of the first friction plates 61a and a maximum static friction between the other one of the main wall segments 31 of the first wall 3 and the respective one of the first friction plates 61a, so as to damp the relative movement between the first and second structural members 1, 2.

Each of the second bolt assemblies 62b includes a bolt 621b and a nut 622b connected threadedly to an end portion of the bolt 621b.

The bolt 621b of each of the second bolt assemblies 62b extends through a respective one of the through holes 631b of the second connecting plates 63b, a respective one of the through holes 611b of the second friction plates 61b and the respective one of the elongate grooves 414 of the main wall segments 41 of the second wall 4, and is movable along the respective one of the elongate grooves 414 of the main wall segments 41 of the second wall 4, such that the second friction plates 61b, the second connecting plates 63b and the second viscoelastic units 52b are movable frictionally relative to the second wall 4 in the second direction (D2) when another resulting force that results from the external force driving the relative movement between the first and second structural members 1, 2 and that is exerted at the second end portions 512b of the swing rods 51 in the second direction (D2) exceeds a sum of a maximum static friction between one of the main wall segments 41 of the second wall 3 and the respective one of the second friction plates 61b and a maximum static friction between the other one of the main wall segments 41 of the second wall 4 and the respective one of the second friction plates 61b, so as to damp the relative movement between the first and second structural members 1, 2.

To sum up, in this invention, the viscoelastic damper 5 amplifies the relative displacement between the first and second structural members 1, 2 to thereby generate shear deformations of the viscoelastic members 521a, 521b to damp the relative movement between the first and second structural member 1, 2. The friction damper 6 cooperates with the viscoelastic damper 5 to damp the relative movement between the first and second structural member 1, 2 in response to a severe earthquake or a very strong wind. The limiting mechanism 7 limits a relative displacement between the first and second walls, and to limit the shear deformations of the viscoelastic members 521a, 521b to prevent fractures and failures of the viscoelastic members 521a, 521b.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lever viscoelastic damping wall assembly adapted for damping a relative movement between a first structural member and a second structural member in a first direction, the first and second structural members being spaced apart from each other, said lever viscoelastic damping wall assembly comprising:
 a first wall adapted to be connected to the first structural member, and formed with at least one pivot hole;
 a second wall adapted to be connected to the second structural member, and formed with at least one pivot hole, said pivot holes of said first and second walls being spaced apart from each other in a second direction perpendicular to the first direction; and
 a viscoelastic damper including
  at least one swing rod that has a middle portion formed with first and second extending holes, and first and second end portions disposed respectively at opposite sides of said middle portion, said first and second extending holes being aligned respectively with said pivot holes of said first and second walls,
  at least one first viscoelastic unit that is connected between said first wall and said first end portion of said swing rod,
  at least one second viscoelastic unit that is connected between said second wall and said second end portion of said swing rod,
  at least one first bolt assembly that extends through said pivot hole of said first wall and said first extending hole of said swing rod to interconnect pivotally said swing rod and said first wall, and
  at least one second bolt assembly that extends through said pivot hole of said second wall and said second extending hole of said swing rod to interconnect pivotally said swing rod and said second wall;
 wherein, the first and second structural members drive a relative movement between said first and second walls in the first direction due to the relative movement therebetween, so as to pivot said swing rod relative to said first and second walls, and to thereby generate shear deformations of said first and second viscoelastic units to damp the relative movement therebetween;

wherein said first wall is adapted to be connected to a lower end of the first structural member, said second wall being adapted to be connected to an upper end of the second structural member; and wherein:

each of said first and second walls further has a main wall segment; and each of said first and second viscoelastic units includes
- a viscoelastic member that has a side connected fixedly to said main wall segment of the corresponding one of said first and second walls,
- a connecting member that is connected fixedly to an opposite side of said viscoelastic member opposite to said main wall segment of the corresponding one of said first and second walls, and
- a bolt assembly that interconnects pivotally said connecting member and the corresponding one of said first and second end portions of said swing rod.

2. A lever viscoelastic damping wall assembly adapted for damping a relative movement between a first structural member and a second structural member in a first direction, the first and second structural members being spaced apart from each other, said lever viscoelastic damping wall assembly comprising:

a first wall adapted to be connected to the first structural member, and formed with at least one pivot hole;

a second wall adapted to be connected to the second structural member, and formed with at least one pivot hole, said pivot holes of said first and second walls being spaced apart from each other in a second direction perpendicular to the first direction; and a viscoelastic damper including
- at least one swing rod that has a middle portion formed with first and second extending holes, and first and second end portions disposed respectively at opposite sides of said middle portion, said first and second extending holes being aligned respectively with said pivot holes of said first and second walls,
- at least one first viscoelastic unit that is connected between said first wall and said first end portion of said swing rod,
- at least one second viscoelastic unit that is connected between said second wall and said second end portion of said swing rod,
- at least one first bolt assembly that extends through said pivot hole of said first wall and said first extending hole of said swing rod to interconnect pivotally said swing rod and said first wall, and
- at least one second bolt assembly that extends through said pivot hole of said second wall and said second extending hole of said swing rod to interconnect pivotally said swing rod and said second wall;

wherein, the first and second structural members drive a relative movement between said first and second walls in the first direction due to the relative movement therebetween, so as to pivot said swing rod relative to said first and second walls, and to thereby generate shear deformations of said first and second viscoelastic units to damp the relative movement therebetween;

wherein said first wall is adapted to be connected to a lower end of the first structural member, said second wall being adapted to be connected to an upper end of the second structural member; and wherein:

said first wall further has an end wall segment that is adapted to be proximate to the first structural member, said second wall further having an end wall segment that is adapted to be proximate to the second structural member; and each of said first and second viscoelastic units includes
- a viscoelastic member that is connected fixedly to one side of said end wall segment of the corresponding one of said first and second walls opposite to the corresponding one of the first and second structural members,
- a connecting member that includes
  - a plate segment connected fixedly to one side of said viscoelastic member opposite to said end wall segment of the corresponding one of said first and second walls, and
  - a connecting segment extending from one side of said plate segment opposite to said viscoelastic member, and
- a bolt assembly that interconnects pivotally said connecting segment and the corresponding one of said first and second end portions of said swing rod.

* * * * *